United States Patent
Gadberry et al.

(10) Patent No.: US 8,341,010 B1
(45) Date of Patent: Dec. 25, 2012

(54) METHOD AND SYSTEM FOR COUNTING HOUSEHOLDS WITHIN A GEOGRAPHIC AREA

(75) Inventors: Adam A. Gadberry, Little Rock, AR (US); Christopher L. Tackett, Benton, AR (US); Brandon W. Gabel, Little Rock, AR (US); Larry F. Martin, Sherwood, AR (US)

(73) Assignee: The Gadberry Group, LLC, Little Rock, AR (US)

( * ) Notice: Subject to any disclaimer, the term of this patent is extended or adjusted under 35 U.S.C. 154(b) by 1318 days.

(21) Appl. No.: 11/602,807

(22) Filed: Nov. 21, 2006

(51) Int. Cl.
G06Q 10/00 (2012.01)

(52) U.S. Cl. ............... 705/7.34; 705/7.31; 705/7.32; 705/7.33

(58) Field of Classification Search ............ 705/7-10, 705/7.11-7.42
See application file for complete search history.

(56) References Cited

U.S. PATENT DOCUMENTS

| | | | |
|---|---|---|---|
| 7,139,675 B2 * | 11/2006 | Banks et al. | 702/181 |
| 7,167,907 B2 * | 1/2007 | Shaffer et al. | 709/219 |
| 7,247,024 B2 * | 7/2007 | Bright et al. | 434/130 |
| 7,428,526 B2 * | 9/2008 | Miller et al. | 1/1 |
| 2002/0198760 A1 * | 12/2002 | Carpenter et al. | 705/10 |
| 2004/0141604 A1 * | 7/2004 | Shaffer et al. | 379/201.02 |
| 2007/0161378 A1 * | 7/2007 | Marchand et al. | 455/456.1 |

OTHER PUBLICATIONS

The Gadberry Group, LLC white paper, "Precise Population Analysis Using Micro-Build Data Methodology," Dec. 2003.
Claritas, Inc. white paper, "Questions to Ask Your Demographic Provider," available at http://www.claritas.com/claritas/default.jsp?ci=3&si=1&pn=demoqa on Apr. 21, 2006 (publication date unknown).
MapInfo Corporation white paper, "Methodologies" (publication date believed to be 2003).
ESRI white paper, "A Break from the Past: ESRI's 2006 Demographic Updates" (Sep. 2006).

* cited by examiner

Primary Examiner — David Rines
(74) Attorney, Agent, or Firm — J. Charles Dougherty

(57) ABSTRACT

A method and system for providing an accurate count of total households and seasonal households within a defined geographic area is disclosed. The invention has application in, for example, the identification of potential sites for retail business locations. The invention utilizes additional data sources beyond census data in order to provide more accurate household counts, particularly in high-growth areas when census data has become stale. Seasonal households are counted by the use of telephony data containing spatially inconsistent records (SIRs), that is, records for which the billing address does not match the location where the telephone service is provided. Households for which an exact address is not known are allocated within the geographic area of interest according to various spreading models.

17 Claims, 8 Drawing Sheets

METHOD AND SYSTEM FOR COUNTING HOUSEHOLDS WITHIN A GEOGRAPHIC AREA

BACKGROUND OF THE INVENTION

The present invention relates to a method and system for counting the number of households within a particular region, and in particular relates to such a method and system that accounts for seasonal households and provides accurate household counts in high-growth areas.

A precise knowledge of the number of households that are located within a particular geographic region is desirable for a number of different applications. One application of such knowledge is in commercial site analysis. The purpose for a site analysis is to determination whether a geographic area is a desirable location for a retail business. Such site analysis is commonly approached in two different ways. In a first approach, a particular candidate site is chosen and an analysis is performed with respect to the geographic area that a retail business located at that site would serve. In a second approach, a larger geographic area is analyzed to determine which sub-areas within that area would be the best candidates for a new retail location. In either approach, a precise determination of the number of households (or population) in the region of interest is essential, since that will determine the potential customer base for a retail business located at the candidate site.

It is often the case that the most desirable sites for a new retail business will be those located where the population is growing most rapidly. Identification and accurate household counts with respect to these rapidly-growing areas is thus highly valuable in any sort of site analysis. Such areas are, however, the most difficult areas in which to perform an accurate household count. Due to the lag between the establishment of a new household in an area and the reporting of that household through various channels and data sources, most of the data sources used to provide household, information become less accurate as the rate of increase in population in an area trends upwards.

There are several site analysis products currently offered in the marketplace. The leading providers of these products include Claritas Inc. of San Diego, Calif. The services provided by such companies include a means of estimating households (or population) within a defined geographic region based principally upon U.S. Census Bureau data. Once every decade, the U.S. Census collects a broad range of statistical data about the U.S. population, including the counting of households within small geographic units of area across the United States. Since U.S. Census data is only released every ten years, the accuracy of any household count based on census data degrades as the time from when the data was collected increases. A household estimate provided shortly after the data is released is likely to be highly accurate, while a household estimate provided several years later is likely to be significantly less accurate, even if the algorithm and data sources used to provide the estimate remain the same. This problem is most pronounced in those geographic areas that are undergoing the highest growth, particularly where this growth is increasing exponentially rather than linearly from past census data. For example, an estimate of the 2006 population of the Las Vegas, Nev. metropolitan area based on a linear projection of 1990 and 2000 U.S. Census data will significantly underreport the number of households that are actually found in that area. Since it is these high-growth areas that are most likely to be of interest to retailers looking for new retail sites for their businesses, this problem with the timeliness of U.S. Census Bureau data significantly diminishes the value of these existing site analysis services. What is desired then is a means of counting the number of households in a defined geographic area that is accurate even in areas that are experiencing high growth, and even at times when several years have passed since the last U.S. Census data was collected.

One data provider, MapInfo Corporation of Troy, N.Y., has developed a population projection product that, while still employing U.S. Census data for its current household counts, does use additional data for future population projections based on modeling techniques. Such data includes consumer marketing lists and the U.S. Postal Service delivery statistics file (often referred to simply as the "del stat" file). The del stat file includes the number of post office boxes and business/residential deliveries on city, rural, and highway contract routes for every ZIP Code in the United States. While the MapInfo product improves the accuracy of its population projections using the del stat file, it still relies on U.S. Census data for its current household counts, and thus suffers from the limitations inherent in the use of this data, including an inability to provide accurate counts in high-growth areas when the census data has become stale.

Another limitation on existing methods of providing site analysis is that they cannot accurately count the number of households in a geographic area that are "seasonal," that is, that are vacation homes or are otherwise not the primary residence of the homeowner. An accurate count of seasonal households within an area may be of great value to certain retailers, such as, for example, hardware and home improvement stores. The presence of a large number of seasonal households in an area may indicate a large potential market, even where the permanent population might not indicate the presence of such a market. U.S. Census Bureau decennial data includes a count of "vacant seasonal units" (VSUs), which are those buildings that appear to the census takers to be seasonal households since they were not occupied at the time that the census data in the area was collected. Because of the manner in which this data is collected, it is believed to be less accurate than many other types of census data. In addition, and like other census data, the accuracy of this data degrades with time. As a result, the VSU count from census data for a particular area experiencing high growth in seasonal units may be highly inaccurate within several years after the census data was collected. On the other hand, U.S. Census Bureau data is the only known direct source of data identifying seasonal households. Given the limitations of this data source, it would be desirable to provide a more accurate means of counting the number of seasonal households in an area, particularly in an area experiencing high growth, and even more particularly in an area that is experiencing high seasonal household growth.

With respect to any attempt to generate household-level population counts, still another problem is the geographical location of households that are known to exist but for which a precise geographic location is not known. One prior art method, known as "area density," distributes population based simply on a proportional measurement of area. For example, suppose that a geographic region may be divided into ten sub-regions. Further suppose that there are one hundred households that are known to lie somewhere in the region, but it cannot be determined directly from available data in which sub-region the households may be found. The area density method would distribute the households across the sub-regions based on the ratio of each sub-region's area to that of the overall geographic region. The largest sub-regions thus will be assigned the greatest number of households, with smaller sub-regions receiving fewer households, down to the smallest sub-region which will receive the fewest. A slightly improved technique known as "block density" distribution is sometimes used where a number of households are known to exist somewhere in a U.S. Census block group, but the precise block where those households are located is not known. The block density approach simply distributes the households across the blocks that comprise the block group based on a pro-rata apportionment. The problem with both of these approaches is that they do not take into account the fact that new household construction tends to be concentrated in relatively small geographic regions that are seen to be highly desirable. In the area density example above, if a large new housing subdivision accounted for most or all of the additional 100 households, it would likely lie in only one or two of the geographic sub-regions. The area density approach, however, would spread those households into all of the other regions as well. The result would be a significant undercount of households in the sub-regions where the subdivision was actually constructed. Likewise, this type of algorithm would overcount the number of households in the sub-regions that are not experiencing growth due to the subdivision. The same problem would occur if block density distribution were used, since the growth is likely concentrated in one or two blocks, but the distribution scheme would spread the households across all of the blocks. This is a particularly important problem since, again, high-growth areas such as the geographic sub-region where the subdivision was built are precisely the areas that are of greatest interest to many retailers for whom a site analysis is performed. It is thus also desirable to provide a means of distributing households for which an exact geographic location is unknown based on factors more accurate than a simple allocation by area, such as by housing density, in order to more accurately count households in those areas experiencing the highest growth.

SUMMARY OF THE INVENTION

The present invention is directed to a method and system for providing an accurate count of households, and, in preferred embodiments, seasonal households, within a defined geographic area. The present invention relies on data sources other than U.S. Census Bureau data in order to develop a more accurate and up-to-date household count in each area of interest. In a preferred embodiment, the United States Postal Service (USPS) del stat file is used in combination with certain telephony data. The inventors have found that the del stat file tends to overcount households within any given area because a delivery point is not necessarily associated with an occupied residence. For example, a postal carrier may consider every mailbox at an apartment complex to be a delivery point, even though some of the apartments are unoccupied. Because the size of the route assigned to a U.S. postal carrier is determined in part by the number of delivery points on that route, postal carriers may have some incentive to overstate the number of delivery points on their routes, or at least have a disincentive to promptly reduce the number of delivery points when a delivery point is no longer clearly associated with an occupied household. As a result, any household count system based solely on the del stat file is likely to significantly overstate the number of households in any given region of interest. The other main component of augmented household data in a preferred embodiment is telephony data, which comprises a telephone number and an address for the telephone service. A careful analysis of these two data sources together for a particular region is believed to provide a more accurate count of the number of households in a given region, particularly where U.S. Census data has become stale, since USPS delivery statistics data and telephony data are updated far more often than U.S. Census Bureau household counts.

In addition, a preferred embodiment of the invention allows a more accurate count of seasonal households by using the telephony data. The inventors have observed that landline telephones associated with seasonal households often have a billing address that is not the same as the address of the household where the telephone is located. This is because the telephone service customer wishes the bill to be sent to his or her primary residence. The geographic location of a telephone switch associated with a particular telephone number may be known, and thus the distance between the billing address (primary residence) and the household where the telephone is located may be determined. Using these sorts of calculations, a more accurate count of the number of seasonal households in a particular geographic region may be provided according to the invention.

Finally, the invention in various preferred embodiments may comprise novel methods of distributing households within a geographic area when those households are not associated with a precise geographic location found in the available data. The models used in the various embodiments of the present invention for distribution of households are not based simply on geographical area, but instead incorporate other factors into the distribution. Such factors may include, without limitation in various embodiments, a consideration of whether the household to be distributed is determined to be a seasonal household or primary residence; in the case of seasonal units, the ratio of VSUs from U.S. Census Bureau data in each sub-region as compared to other possible sub-regions to which the household could be distributed; the ratio of VFR (vacant for rent) households from census data in each sub-region as compared to other possible sub-regions to which the household could be contributed; the relationship between the sub-region in which a particular telephone switch is located to the sub-regions surrounding or touching that sub-region; and the level of specificity by which the location of a particular household is known.

It is therefore an object of the present invention to provide for a method and system for counting the number of households in a particular region, for purposes such as site analysis, whereby the count provided with respect to high-growth regions is accurate, even when U.S. Census Bureau data for the sub-region has grown stale;

It is a further object of the present invention to provide for a method and system for counting the number of seasonal households in a particular region, particularly providing an accurate count of seasonal households in those regions that are experiencing high growth or high seasonal-household growth.

It is also an object of the present invention to provide for a method and system for counting the number of seasonal households in a particular region that more accurately distributes those households for which an exact address is not known to sub-regions associated with the region.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENTS

Figure 1:
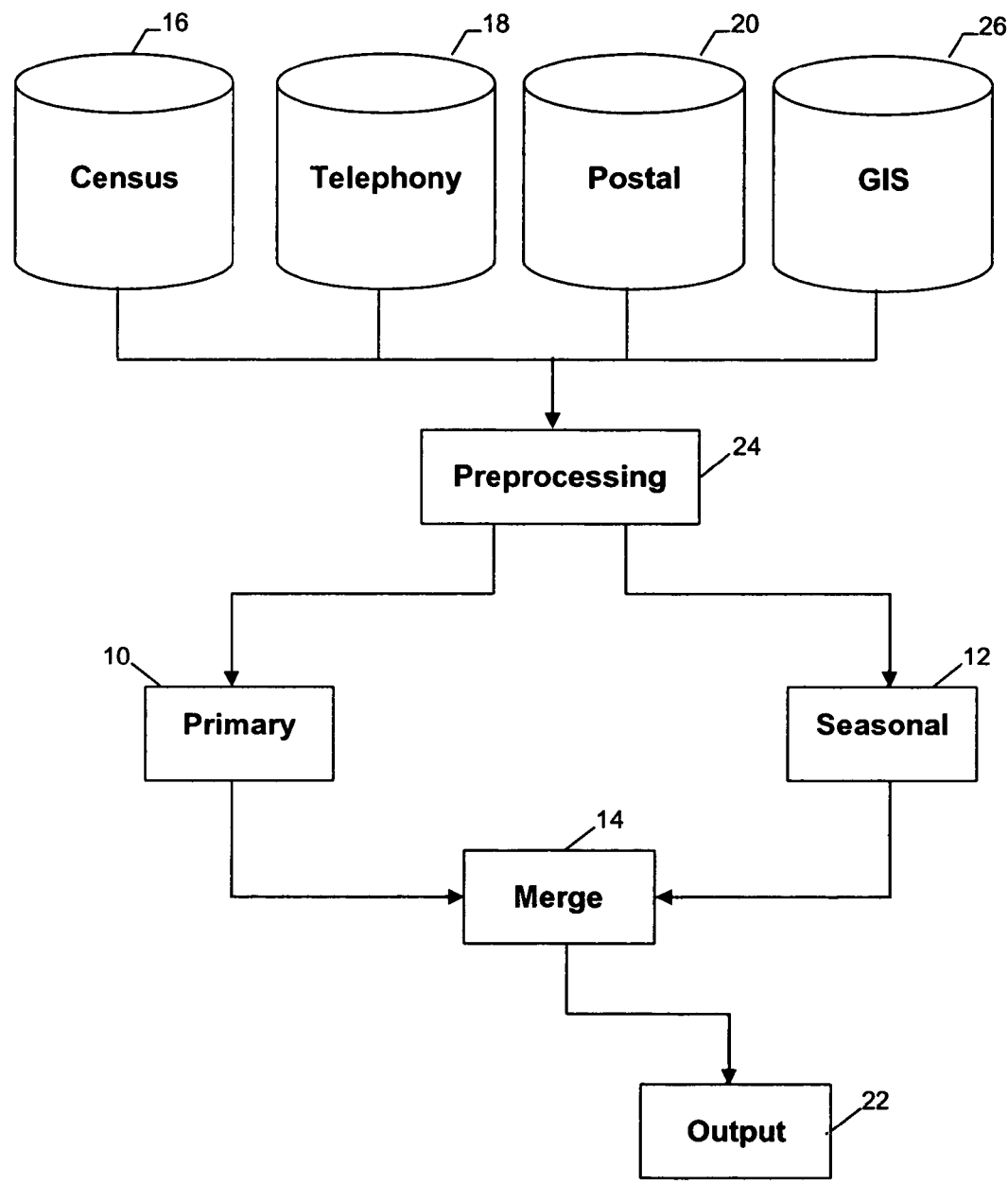
FIG. 1 is an overview block diagram depicting the major processes and data sources for a preferred embodiment of the present invention.

With reference to FIG. 1, an overview of the processing performed according to a preferred embodiment of the present invention may be described. The main processing for the preferred embodiment is generally divided into four sections. At primary build routine 10, a count is provided for the number of households within each geographic region in a defined geographic area. At seasonal build routine 12, a count is provided for the number of seasonal households within each geographic region in that same defined geographic area. Merge routine 14 serves to combine the results of primary build 10 and seasonal build 12 and generate an output in a format that may be used for various applications, including, for example, retail site analysis. Preprocessing routine 24 provides certain map overlay and related functions that generate maps and related data tables that are used as inputs to primary build 10 and seasonal build 12.

In a preferred embodiment, the geographic area of interest is the United States, and the geographical sub-areas for which individual household counts are ultimately provided are U.S. Census Bureau block groups. A block group is defined as a subdivision of a census tract. Most block groups have been delineated by local participants in the census as part of the U.S. Census Bureau's Participant Statistical Areas Program. Each block group is divided into a number of blocks, which are the lowest level of the geographic hierarchy for which the U.S. Census Bureau tabulates and presents sample data. Because of the manner in which census data is presented, the block group is viewed as an ideal candidate area for applications such as retail site analysis. Other sub-areas could be used for household counts in alternative embodiments of the invention, however, such as census "places" (which will be explained in more detail below) and ZIP code boundaries. Also, the invention could also be applied to areas of interest other than the United States, although the types of data needed for execution of the invention may not be available in all areas of the world, or would be of such poor quality that the resulting household counts would not be as accurate. Other areas, such as Canada and some European countries, for example, are associated with data sources that provide identical or closely analogous information to that described for use herein with respect to the United States. Another approach could be to self-define sub-regions of interest, such as radius selection, that is, drawing rings around points of interest.

A number of data sources are used in the processing performed by primary build 10, seasonal build 12, and preprocessing routine 24. The four main classes of data sources used in the preferred embodiment are census data 16, telephony data 18, postal data 20, and geographical information service (GIS) data 26. Census data 16 comprises various data and data sets made available to the public by the U.S. Census Bureau. This information includes various types of population and demographic information. Telephony data 18 is a collection of data sources made available by landline telephone service providers, including information about telephone service subscribers and telephone switch information. Postal data 20 is a collection of data sets provided by the United States Postal Service (USPS); these data sets involve, for example, postal delivery information and ZIP code information. Finally, GIS data 26 includes various sorts of spatial and map-based information concerning the area of interest, preferably the United States, made available by commercial GIS providers.

Certain of the processes performed by primary build 10 and seasonal build 12 in the preferred embodiment require the construction of specialized overlay maps and tables. The generation of these maps and tables is the function of preprocessing routine 24. As noted above, the present invention uses data from various sources, such as the U.S. Census Bureau, the U.S. Postal Service, and various landline telephone service providers. Each of these data sources are keyed to different geographical subdivisions. For example, USPS data is divided along ZIP code boundaries, census data is divided along block group boundaries, and telephone subscriber information is provided with relation to telephone area codes and prefixes. In order to effectively combine data from these various sources, some means must be generated for translating between the different regional boundaries adopted by these different data sources. One purpose then of preprocessing routine 24 is to generate overlay maps and tables that make this translation possible. For example, an overlay of census block groups with ZIP code boundaries enables the identification of all ZIP codes that cross a particular block group. In addition to the generation of such maps, preprocessing routine 24 is used to generate various tables that contain data that is derived from or used alongside these overlay maps.

As noted above, merge routine 14 serves to combine the results of primary build routine 10 and seasonal build routine 12, generating output table 22 in the preferred embodiment. Output file 22 preferably includes household count information for every block group in the United States. In an alternative embodiment, output file 22 may be limited to the household count for a particular block group, ZIP code, or other smaller defined region. The desired output will depend upon the application. For example, a retailer seeking to locate an area or areas in which to build new retail sites may desire a broader view, such as a household count for an entire county, state, or even the entire United States. On the other hand, a retailer that has already identified a particular area and simply wishes to check whether growth in that region is sufficient to support a planned retail store may wish to receive the household count for only the ZIP code or block group where the proposed retail store is to be located. In the case where a client desires an analysis of several proposed sites, several builds may be performed for each block group, ZIP code, or sub-region individually, or a national build may be performed and the pertinent data extracted into output file 22 for that particular client's needs. In addition, output file 22 may contain additional information, including information pulled straight from census data 16, telephony data 18, or postal data 20, in order to provide a simple means of comparison or calculation using the derived data in output file 22. For example, the average household size for the relevant block groups, which is, in a preferred embodiment, found among the data sources of census data 16, may be included with the derived household counts for those block groups in order to facilitate a simple calculation of estimated population for each block group.

Figure 2:
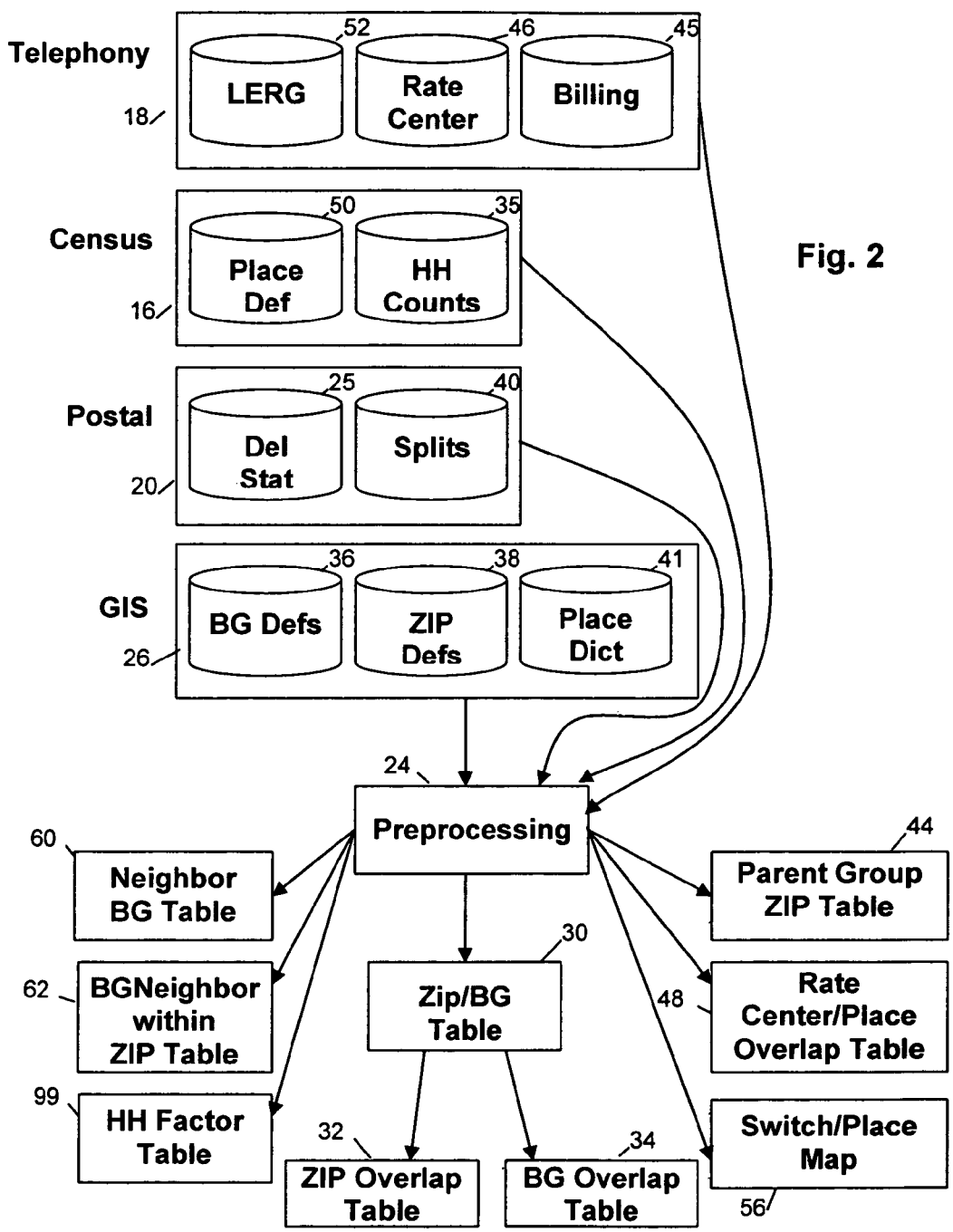
FIG. 2 is a block diagram depicting the preprocessing step of constructing various maps and tables according to a preferred embodiment of the present invention.

Referring now to FIG. 2, the various inputs and outputs of preprocessing routine 24, and the processing performed by preprocessing routine 24 in order to generate these outputs based on these inputs, may be described in more detail. The inputs generally comprise four classes of data, those being census data 16, telephony data 18, postal data 20, and GIS data 26. In the preferred embodiments, each of these data sets may include sub-sets of data that provide specific information with respect to these classes of data. Turning first to census data 16, this data set, as already noted, comprises various types of data from the U.S. Census Bureau. Census data 16 preferably includes the complete household counts 35 for each block group resulting from the previous two decennial census data sets, including those that are occupied by the owner or renter as well as various statuses for vacant housing. Those include "vacant for seasonal, recreational, or occasional use," which is usually referred to herein as a vacant seasonal unit (VSU); vacant for rent (VFR); vacant for sale only (VFS), vacant (rented or sold, not occupied), and vacant (other). VSUs are those units that are believed by the census tabulator to only be used or intended for use in certain seasons, on weekends, or other occasional use throughout the year. VFRs include vacant apartment units as well as school-related housing, which is often occupied only during a part of the year. Vacant for sale indicates that a unit is vacant but there are indicia that the unit is currently for sale, such as a for-sale sign appearing on the property, while vacant (rented or sold) is similar except the property appears to have already been sold. Vacant (other) is a catch-all category for the situation where a unit is vacant but the tabulator cannot determine from any available source what vacant category is appropriate. It may be noted that U.S. Census Bureau data is the only source of data that provides direct counts of individual persons within a particular region across the United States; for this reason, it is considered the most accurate form of household or population count data for the time at which it is tabulated. The U.S. Census Bureau counting algorithm even includes groups of some persons, such as the homeless, who would not likely show up in any commercial data sources. The limitation of U.S. Census Bureau data is that this data is only provided with a full update on a decennial basis. In addition, although vacancy information was collected prior to the 2000 U.S. Census, changes in the tabulation system prevent comparison of this earlier vacancy data with 2000 data, and thus earlier data with regard to vacant units is not used in the present invention.

Census data 16 also includes other data sets in the preferred embodiment. One such data set is place definitions 50. The U.S. Census Bureau has defined a large number of "places" within the United States. Each such place roughly corresponding to a city or town, although large cities may be associated with a number of places, and very small municipalities may not be designated their own census place.

Postal data 20 includes the USPS delivery statistics product (or "del stat" file) 25, which, as noted above, contains information regarding every postal delivery point by carrier route and post office box section. Del stat file 25 will define the number of post office boxes and business/residential deliveries on city, rural, and highway contract routes for every ZIP Code in the United States. Postal data 20 may also include data sources such as ZIP code split file 40, the nature and purpose of which will be explained more fully below.

Telephony data 18 preferably includes an aggregate billing file 45, which includes the name and address associated with all landline telephone customers in a particular geographic area, preferably the United States. Billing file 45 is aggregated from data collected by the various landline telephone service providers in the area of interest. Such information is commercially available from commercial information providers. The inventors have found that telephony data is among the most accurate data sources for the identification of household addresses. This is because the "best" address associated with a telephone record is in many cases a billing address, and there is strong incentive for both the telephone service customer and provider to maintain this address accurately. This data source has its own limitations, however, since, for example, some households are not associated with landline telephones. The resident of the home in question may rely solely on a cellular telephone, as is becoming more common today, particularly in very urban areas. Alternatively, the home resident may have no telephone service at all, which occurs with frequency in some of the most rural areas of the United States. As a result of these issues, billing file 45 tends to undercount the number of actual households in a particular region. Again, the preferred area of interest is the United States, although identical or similar telephony data may be available in other countries, and could be used in alternative embodiments of the present invention. In addition, telephony data 18 may include rate center definitions file 46, which provides a geographic definition for the various landline telephone rate centers across the United States. Rate centers are generally associated with a local calling area associated with a particular telephone switch or switches. Finally, telephony data 18 may include Local Exchange Routine Guide (LERG) data file 52. LERG file 52 contains two types of data that are relevant to the preferred embodiment of the present invention. First, LERG file 52 contains the geographic location of all landline telephone switches in the United States. Second, it contains an association between each of those switches and their corresponding NPAXXX (area code and telephone calling prefix) codes. The data used in LERG data file 52 is published monthly by Telcordia Technologies of Piscataway, N.J., and is available from third-party data providers as well.

Geographic Information Service (GIS) data 26 is comprised of various types of information that contains a geographic component. A GIS source is one that combine relational databases, such as names and household addresses, with spatial interpretation and outputs, often in the form of maps. For example, this information may include maps that provide plotted locations of various streets for purposes of identifying the locations of addresses input to the system. In addition, GIS data 26 includes block group definitions file 36, which comprises the boundaries of each U.S. Census Bureau block group in the United States, as well as ZIP code boundary definitions 38. GIS data 26 may also include place name dictionary 41, which comprises the geographic location of numerous streets and other place names for purposes of plotting these locations and boundaries onto a map. In the preferred embodiment, such information is provided, along with the MapMarker geospatial processing software, by MapInfo Corporation of Troy, N.Y.

Turning now to the outputs of preprocessing routine 24, zip/block group table 30 contains a record for each ZIP code in the United States. Associated with each ZIP code record is a list of those U.S. Census Bureau block groups that cross that ZIP code, as well as a number that represents the area (preferably measured in square miles) of overlap between that block group and the ZIP code associated with that record. This information is computed from the construction of map overlays using GIS information according to techniques as are known in the art. In the preferred embodiment, the map generating components of preprocessing routine 24 are part of a GIS software package called MapInfo Professional, which, like MapMarker, is distributed by MapInfo Corporation. Similar commercial products are available in the marketplace and which may be used in alternative embodiments of the invention.

From ZIP/block group table 30, preprocessing routine 24 is further capable of deriving two additional tables that may be utilized in the processing of primary build routine 10. First, ZIP overlap table 32, like ZIP/block group table 30, contains a record for each ZIP code in the area of interest, preferably the United States. In the case of ZIP overlap table 32, however, the record contains two types of fields: the ZIP code itself, and a set of values, where each value represents the percentage that the ZIP code comprises of each block group associated with that ZIP code in ZIP/block group table 30. The second table, block group overlap table 34, is the inverse of ZIP overlap table 32; it comprises a record for each block group in the area of interest, each such block group being associated with a set of values representing the percentage that the block group comprises of each ZIP code associated with that block group in ZIP/block group table 30. These tables will be used in the allocation models of primary build 10 as further described below.

The data used to construct ZIP/block group table 30, as well as the derived ZIP overlap table 32 and block group overlap table 34, flows from census data 16, postal data 20, and GIS data 26. Block group definitions 36 and ZIP code boundary definitions 38 are used from GIS data 26. In addition, postal data 20 includes, as noted above, a ZIP splits file 40. This file, provided by the USPS on a quarterly basis, contains a summary of all splits and number changes for U.S. ZIP codes over the past 18 months from its publication date. This file is used in the preferred embodiment as a check against the regular ZIP code files in order to ensure that all ZIP code changes have been caught and incorporated into the processing of preprocessing routine 24.

It should be noted that tables 30, 32, and 34 are preferably reconstructed each time that primary build routine 10 and seasonal build 12 are performed. The reason for this is that the data used to generate these tables changes frequently, particularly the ZIP code data. In the preferred embodiment, a new ZIP code boundary definitions file 38 is received quarterly, and substituted for the older data used as an input to preprocessing routine 24. By comparing data from ZIP code boundary definitions file 38 to previous data, changes in ZIP codes may be identified, the results being checked against ZIP splits file 40, as noted above, to ensure accuracy.

Still referring to FIG. 2, additional pre-processing necessary prior to the performance of the primary build routine 10 of the preferred embodiment of the present invention may now be described. As already explained, the number of households identified from telephony data 18 is generally lower than that identified from the delivery statistics portion of Postal data 20. The true number of households in a given geographical area is believed to be somewhere between the totals that would be generated by either of these data sets standing alone. To apply the correct count to a particular geographic area, the first step according to the preferred embodiment of the present invention is to create a means of directly comparing the two data sets by ZIP code boundary areas. Both data sets contain ZIP code information, but the ZIP code data in telephony data 18 is known to lag other data in terms of its currency. This is due to the fact that the United States Postal Service, being the originator of all ZIP code splits and changes, naturally reports such changes quickly, whereas it takes such time for these changes to show up in the billing addresses of landline telephone customers. In order to meaningfully use these data sources together, a table is built to translate older ZIP codes into newer ZIP codes and ZIP code splits for each geographical area. This table, as shown in FIG. 2, is parent group ZIP table 44. For each ZIP code, the "parent" ZIP code of that ZIP code are provided. The parent ZIP code is selected as one of those ZIP codes, if more than one, from which a new ZIP code is created; note that in this case, the ZIP code will be its own parent as well as the parent of a new ZIP code the area of which is carved out from the parent. Since a new ZIP code may be carved out from areas of multiple existing ZIP codes, but a ZIP code may have only one parent in parent group ZIP table 44, one of the possible choices as parent is chosen. Also, it may be noted that since the USPS ZIP splits file 40 looks back to all changes for 18 months, not just the changes since the last USPS ZIP splits file 40 was released, it is known that all data from prior to that time is completely converted, and there is thus no need to track splits or changes from further back in time than this date.

In addition to matching splits and additions in the parent group ZIP table 44, another set of ZIP code matches are included. In the preferred embodiment of the invention, a distinction is made between two different types of ZIP codes. A "boundary" ZIP code may be defined as a ZIP code that applies to a neighborhood or like area. Although a ZIP code is not technically associated with any geographical boundary, but instead with a series of addresses in the same area, boundaries of this area may be created by encircling all of the various physical addresses that use this specific ZIP code. These boundaries are provided in the preferred embodiment as part of ZIP boundaries file 38 in GIS data 26. The second type of ZIP code is a "point" ZIP code. A point ZIP code is one that does not correspond to a geographic area, but rather to a particular geographic point. One example of a point ZIP code is a ZIP code that corresponds to a main post office that maintains a large bank of post office boxes. A single ZIP code is defined for exclusive use with respect to such post office boxes. Another example is a large building with many residences, such as a dormitory or apartment complex, that has a specific ZIP code designated for the building. Point ZIP codes have no boundary, since they correspond to a single geographic point. Data sources used in the preferred embodiment of the invention identify those ZIP codes that are point ZIP codes and also provide the boundary ZIP code within which each point ZIP geographically lies.

It may be seen that point ZIP codes create a complication for any household allocation scheme relying upon telephony data 18 and the delivery statistics portion 25 of postal data 20. Suppose that the physical address of a particular household is within the boundary defined for a particular boundary ZIP code. The address where the bill is actually mailed for this telephone line, however, may be a post office box that is associated with a point ZIP code. It is thus this address that will show up in billing file 45 of telephony data 18. In the preferred embodiment, this problem is solved by including a matching in parent group ZIP table 44 between each boundary ZIP code and all point ZIP codes that are geographically mapped to points within the boundary associated with the associated boundary ZIP code. These are matched in the same manner as ZIP splits are matched within parent group ZIP table 44. It is believed that persons who pick up mail at a particular point ZIP code most likely maintain a primary household within either the block group into which that point ZIP code is mapped or one of the block groups that neighbor that block group. While this assumption is likely not correct in every single case, it is believed that it is correct in the great majority of cases. A person is not likely to receive mail at a post office box that is located a significant geographical distance from his or her residence.

Preprocessing routine 24 may also be used to construct rate center/place overlap table 48. Rate center data 46 is a component of telephony data 18. A rate center is a geographically specified area used for determining mileage and/or usage dependent rates in the Public Switched Telephone Network (PSTN). As noted above, a rate center is, generally speaking, the area that is served by a particular telephone switch or switches, not accounting for telephone number portability. By comparing the geographical boundaries of each place with each rate center, rate center/place overlap table 48 may be generated by preprocessing routine 24. In this case, however, the information desired in the preferred embodiment is not the amount of overlap between a particular place and a particular rate center, but rather whether the overlap between them reaches a certain threshold. In the preferred embodiment, this overlap threshold is 0.1 square miles. Thus rate center/place overlap table 48 contains a list of all rate centers in the geographical area of interest, preferably the continental United States, and for each rate center matches to it each place that overlaps that rate center by at least the designated threshold amount. Again, GIS software is used to construct this table, MapMarker being the software chosen in the preferred embodiment.

One complication that arises in the construction of rate center/place overlap table 48 is that not every point in the United States is associated with a census place, and thus not every household in the United States falls within a census place. Generally, a place is associated with a city or town, although larger cities may be associated with a number of place designations. Many counties, however, will contain sparsely populated areas that are not associated with a place. Since every household should be accounted for in the preferred embodiment of the invention, the part of every county that does not correspond to a census place is designated as its own "none place" in the preferred embodiment of the present invention.

In order to uniquely identify each place and none place, a modified form of the U.S. Census Bureau's Federal Information Processing Standards (FIPS) codes is used. The U.S. Census Bureau are two types of FIPS codes, the county FIPS code and the place FIPS code. The county FIPS code is comprised of a two-digit state code concatenated with a three-digit county code, in the form "SSCCC." The place FIPS code is comprised of the two-digit state code concatenated with a five-digit place code, in the form "SSPPPPP." The preferred embodiment of the present invention uses a modified form of the place FIPS code system to include the concept of the none place. Specifically, the PPPPP portion of the place code for a none place is replaced by a five-digit value that is the concatenation of the corresponding three-digit county code from the county FIPS code system and an "XX" code in the last two digits. In the case of a none place, the code thus takes the form "SSCCCXX," where appropriate values are filled in to designate state and county. It will be seen that each none place will have its own unique FIPS code in this modified system, since by definition there is only one none place associated with each county.

As noted above, LERG data file 52 contains the geographic location, that is, latitude and longitude, of every telephone switch in the United States. Using Mapmarker in the preferred embodiment, preprocessing routine 24 creates an association between telephone switches and places. The telephone switch locations are first drawn onto a map that includes place boundaries from place definitions 50 of GIS data 26. The place into which the telephone switch is mapped is then associated with that switch. Next, rings of a set radius are drawn around the locations of each of the telephone switches, where the radius of each ring is set at 2 miles in the preferred embodiment. The places that overlap with the circular area created by this ring are then associated with the telephone switch. Using rate center/place overlap table, each place that overlaps a rate center overlapping one of the places already associated with the switch is also associated with the switch.

A manual override of the telephone switch/place association may be required in areas that have telephone lines laid in an unusual pattern. This may occur, for example, due to physical obstacles such as a lake or other small body of water. The landline telephone carrier may prefer to extend a line from a switch on one side of the lake somewhat farther than it would normally be extended rather than extending a line from a geographically closer switch on the other side of the barrier. The area that this switch serves, as measured by the radius of the circle drawn around that switch, may be manually adjusted to compensate for the discrepancy resulting from the unusual pattern of telephone lines. The final result of this switch/place association process is switch/place map 56, where the telephone switch/place associations are stored.

In addition, preprocessing routine 24 is used to generate neighbor block group table 60. Block group geographic information is taken from block group definitions 36 of census data 16, and fed into preprocessing routine 24 to determine which block groups are neighbors, that is, have borders that touch at one or more points. Again, software such as MapInfo Professional may be used for this purpose. The result of this calculation is a table that lists each block group and, for each block group found in block group definitions 36, lists all block groups that are neighbors with that block group.

Also, preprocessing routine 24 is also used to construct block group neighbor within ZIP code table 62. This construction is similar to neighbor block group table 60, except that each block group here is matched only with block groups with which it shares a boundary within a particular ZIP code. Thus this table contains three fields for each record: the block group for which the record was created, the ZIP codes that it crosses, and the block groups that are its neighbors within each of those ZIP codes.

Finally, preprocessing routine 24 is employed to build household (HH) factor table 99. As noted above, the actual number of households in any particular small geographic area, such as a block group, is not found directly through either telephony data 18 or postal data 20. Billing file 45 of telephony data 18, which contains records for each of the landline telephones associated with an address in a geographic area, tends to undercount the number of households in the region. Delivery statistics data 25 from postal data 20, on the other hand, tends to overcount the number of households. The inventors have found that the real number of households in a particular area generally falls somewhere between the number of addresses identified from billing data 45 of telephony data 18 and delivery statistics file 25 of postal data 20. In addition, the inventors have recognized that the difference between the household counts from these two data sources varies depending upon population density: rural and urban regions show a greater difference, while the numbers tend to be closer for suburban areas.

More particularly, and based on empirical studies, the inventors have determined that the true household count in any geographic region usually lies at a value that is sixty to eighty percent of the difference between the counts derived from telephony data 18 and postal data 20. The ratio of total households in a ZIP code as determined by these two data sources varies from about 1:1 to about 1:1.6 of the count from telephony billing file 45 compared the count from delivery statistics file 25, with a national average of around 1:1.17. This ratio will be referred to herein as the household (HH) factor. One purpose then of preprocessing routine 24 is to determine, for each ZIP code in the area of interest (preferably the United States), the appropriate HH factor for that ZIP code. Census data 16 is used to determine, for each place, the population density of that region. Using that information, the appropriate HH factor is assigned to each ZIP code in the place, and the resulting output is HH factor table 99. This table is used in the processing of primary build routine 10.

In a preferred embodiment, each ZIP code will be associated with one of a series of HH factor categories. In particular with respect to the preferred embodiment, three HH factor categories are chosen: moderate, aggressive, and very aggressive. The category assignment is made for each ZIP code based upon a determination of where the inventors believe that the correct count for that particular ZIP code lies in the spectrum between the telephony billing file 45 and the delivery statistics file 25. To calculate the HH factor for a particular ZIP code using the HH factor categories, the difference between the household totals from the two files is first calculated. This value is then multiplied by a fraction representing the HH factor category, which must have a value between 0 and 1. The fraction used with the "moderate" category will be a smaller value, and is generally associated with suburban areas. The "aggressive" category fraction is generally associated with urban or rural areas, and the "very aggressive" category, the highest fraction, is used in a few extremely urban areas. The value resulting from this calculation is then divided by the number of households from the telephony billing file 45, and then added to 1. The resulting HH factor is written through preprocessing routine 24 at HH factor table 99. In later processing, this factor will be applied to every address within the ZIP code, regardless of the block group that each household falls within.

Figure 3:
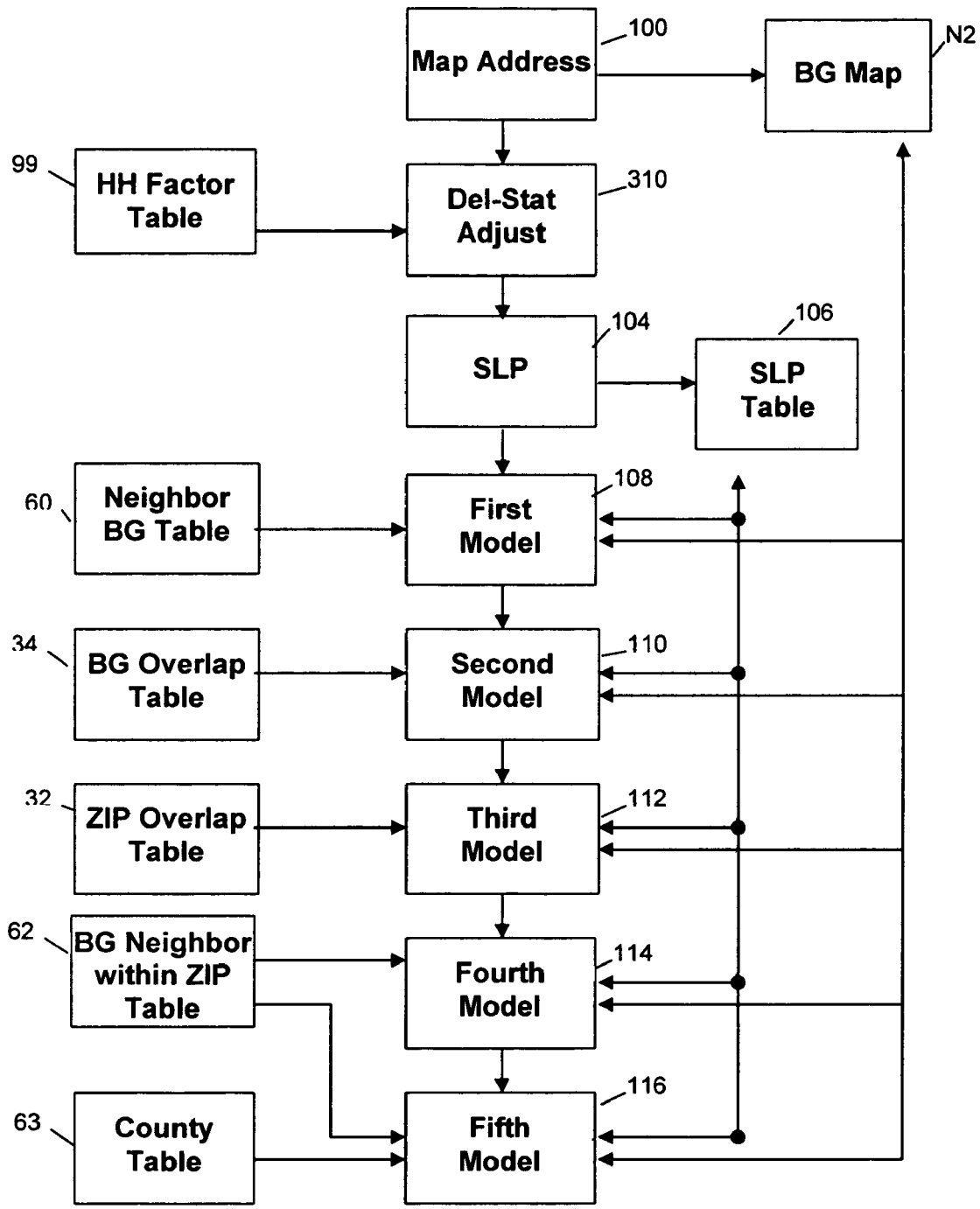
FIG. 3 is a block diagram depicting the primary build process for a preferred embodiment of the present invention.

Turning now to FIG. 3, the various steps in the processing of primary build routine 10 may now be described. The purpose of map address block 100 is to initially map each identified household in the region of interest, preferably the United States, to a particular block group. The household information is drawn from billing file 45 of telephony data 18. One of the chief complications of any effort to count the number of households within a small geographic unit, however, is the fact that the precise geographic location of many households is not known. For newer addresses, particular those in more remote locations, a precise location is simply not available. This is a result of the fact that some time is required for new streets to be identified, mapped, and input into the database "dictionary" 41 used by MapMarker and similar products. Overcoming this problem is particularly critical for purposes of the present invention, since the areas that are fastest growing are likely to be most affected by this lag in address accuracy, and since these are precisely the areas that are likely to be of greatest interest to customers seeking services such as site analysis.

The inventors have found that about 89-90% of all households across the United States may be matched to a precise location using MapMarker. Suburban areas have the highest hit rates for "full address" matches, that is, addresses for which a precise location is known. Rural areas have lower hit rates because data for these areas, being generally of less commercial interest, is updated less frequently. Another problem area is high-growth regions, where new streets are being added that have not yet been updated to the MapMarker software. These are of course one of the types of areas of greatest interest in retail site analysis, and thus a particular problem that must be addressed in the preferred embodiment of the invention.

The level of specificity with which most addresses are known may be defined along a spectrum. MapMarker defines six different types of addresses based upon their specificity, which are as follows:

S1: known within ZIP code boundary
S2: known within ZIP+2 boundary
S3: known within ZIP+4 boundary
S5: full address match
S6: post office boxes For example, S1 addresses are those for which no precise geographic location information is available; since the ZIP code of the address is known, however, it can at least be determined that the address is located somewhere within the boundary defined for that ZIP code. Similarly, with respect to S2 addresses, a ZIP+2 boundary is known. In other words, it is known that the address lies somewhere within a seven-digit ZIP code boundary, which is a sub-set of the area within the associated five-digit ZIP code boundary. S2 addresses are often associated with new residential building sites, and are thus of particular interest for site analysis clients. These categories are employed within the preferred embodiment of the present invention as will be described below, but other means of delineating the specificity of an address could be employed in alternative embodiments.

Again, the overall purpose of primary build 10 is to count the number of households associated with a group of small geographic areas, those areas being U.S. Census Bureau block groups in the preferred embodiment. The first step of this process is to map each of the households onto block group map 102 generated from block group definitions 36 of census data 16. It may be seen that for all S5 addresses, no further processing is necessary, since the exact latitude and longitude may be known for those addresses from MapMarker's street and address dictionary. In the preferred embodiment, those addresses are simply mapped onto block group map 102 at their known location. In addition, S3 addresses are known to a very high degree of accuracy, although the precise location of the address is not known. Generally, a ZIP+4 corresponds to a very small geographic area, such as a city block, a group of apartments, or an individual high-volume receiver of mail. Because the location of an S3 address is known to such a high degree of accuracy (that is, the area in which it may be located is so small), it may be treated the same as an S5 full address match for purposes of the preferred embodiment. The location of an S3 address is provided by MapMarker in the preferred embodiment; it is calculated as the centroid of the associated ZIP+4 boundary.

While the S3 and S5 addresses may be mapped to precise points, S1 and S2 addresses are not associated with a geographic region of sufficient particularity to allow them to be treated in this manner. Some means must therefore be employed to allocate or "spread" these addresses to the appropriate block group in order to generate accurate block group household counts. As a first step in the allocation process for these addresses, however, they are simply mapped to centroid locations associated with the regions in which they are known to lie, similar to the process employed for S3 addresses. In particular, S1 addresses are mapped to the centroid of the associated ZIP code boundary region, and S2 addresses are mapped to the centroid of the associated ZIP+2 boundary region. Finally, due to the fact that S6 addresses are point ZIP codes, then are mapped to the precise latitude and longitude known for that particular point. Since these are post office boxes, however, it is known that they do not correspond to households, and they, along with the S1 and S2 addresses, will be allocated in later processing.

Although S2 addresses are not susceptible to being mapped to a precise location, they are, unlike S6 and S1 addresses, mappable to a location that is quite near the actual geographic point at which they are believed to lie. For this reason, and as will be seen, S2's are treated in a unique manner in the preferred embodiment of the present invention. Specifically, they are treated as if geographically located in the block group associated with the boundary region midpoint up until near the end of the allocation models. They are only spread to neighboring block groups to smooth out anomalies created by placing too many S2 addresses into one block group, causing high household growth in that block group while its neighboring block groups show declining households.

As already noted, it is known that telephony data 18 undercounts the number of households in an area relative to the count that might be made by the U.S. Census Bureau at a particular time. In order to generate a more accurate count of households for each block group, the number of households allocated to each block group in each category is multiplied by the appropriate HH factor from HH factor table 99 at del stat adjust block 310. The purpose of this calculation is to produce the final household count in each category prior to the application of the various spreading models.

Now it may be seen from the above discussion that the result of map address routine 100 and del-stat adjust 310 is the mapping of addresses from billing file 45 of telephony data 18 to a particular block group, but it is known that many of the addresses at this point are mapped to an incorrect block group. For example, block groups that contain S6 addresses probably contain a number of households at this point in processing that is significantly higher than the actual number, while surrounding block groups may have a total that is significantly lower than the actual number. In order to increase the accuracy of the counts for each block group, the S1, S2, and S6 addresses must then be allocated into block groups by some means. The first step of this process is to determine which block groups may be missing households, and are thus candidates to receive allocated households from other block groups. This determination is made at straight line projection (SLP) block 104. SLP routine 104 takes the number of households for each block group from the HH counts file 35 of census data 16 and creates a straight-line projection of the number of households that, according to this simple model, should be found in each block group. Since HH counts file 35 contains the data for the last two decennial census results, a straight line is simply drawn from these two points, and resulting extrapolation is determined to the current date. The result is SLP table 106, which for each block group matches the number of households projected to be found in that block group by SLP routine 104. Once SLP table 106 is constructed, the "need" associated with a particular block group may be defined. The need of a block group is the projected number of households for a block group from SLP table 106, less the number of households that have been allocated to that block group at this point of processing. It may be noted that, at this point, the S5, S3, and S2 addresses those that have been allocated, although it is possible that the S2 addresses could still be spread to a neighboring block group in later processing.

In order to allocate the non-specific addresses to a block group in the preferred embodiment, a series of five models are applied to the data presented on block group map 102. Alternative embodiments may delete, modify, or add to the series of models presented here, all within the scope of the present invention. The first model allocates a portion of the S6 addresses. The second model allocates more of the S6 addresses and some of the S1 addresses. The third model allocates the remaining S1 and S6 addresses. The fourth and fifth models allocate the S2 addresses. As already noted, the S5 addresses are those for which an exact geographic location is known, and no allocation is required. Likewise, the S3 addresses are those for which, although the exact physical location of the address is not known, the possible location of these addresses is reduced to a small enough area that no allocation beyond the centroid of the associated ZIP+4 region is deemed necessary for block group-level household allocation.

At first model 108, S6 (post office box) addresses are allocated to block groups neighboring the block group containing each of the S6 addresses. This model is based upon the assumption that the great majority of persons using postoffice boxes either live in the same block group as the post office box is located or live in one of the block groups that neighbor that block group. (It should be noted that each block group throughout the processing described herein is considered to be a neighbor with itself, so an allocation to neighbors would include an allocation of some points to the block group where they are initially plotted.) In the case of first model 108, all allocations are made based on need, and the defined need of a particular block group (as defined in SLP table 106) is never exceeded. The allocation is made for each of the relevant block group's neighbors, proceeding through each of the block groups in the area of interest for one complete iteration. Because the possible allocation is limited by need, it may be seen that some S6 addresses will most likely remain unallocated at the completion of this process. The data source used for this process is neighbor block group table 60.

An example may be used to describe the operation of first model 108 in more detail. Consider a block group designated 01, for which the neighboring block groups are found to be 01, 04, 02, and 09 from neighbor block group table 60. Further assume that the calculation is being performed after the release of data for the 2000 U.S. Census, but before the release of data for the 2010 U.S. Census, so that the census information for 1990 and 2000 results is found in SLP table 106. The following information may then be synthesized from data in SLP table 106 and block group map 102:

| block group | 1990 HHs | 2000 HHs | current SLP | allocated HHs | need |
|---|---|---|---|---|---|
| 01 | 100 | 150 | 180 | 150 | 30 |
| 04 | 200 | 205 | 208 | 190 | 18 |
| 02 | 400 | 390 | 384 | 300 | 84 |
| 09 | 100 | 100 | 100 | 50 | 50 |

The allocated households total for each block group is initially calculated by adding the total of all S5, S3, and S2 addresses located in that block together from block group map 102. (It may be noted that while S2 addresses are treated in this model as non-allocated, they will be allocated in later models.) As the allocation process of the first model proceeds for each block group, then the allocated HHs total for that block group will also include those S6s that have been allocated to that block group from its neighboring block groups.

The need is simply the difference between the current SLP for the block group and the allocated HHs. The need determines the total number of S6s that may be allocated by the first model to any particular block group. The S6 addresses from a block group that need allocation are distributed to the neighboring block groups in proportion to the ratio of that block group's need to the total need of all neighboring block groups. In the following example, therefore, the ratio for block group 01 would be 30/182, or 17%. It may be noted that should the initial number of allocated HHs exceed the SLP for a particular block group, then the need will be equal to zero, and no S6 addresses will be allocated to that block group in first model 108. If a block group's need is completely filled during the processing of the first model (that is, if the allocated HH total equals the current SLP total), then the need for that block group has been met, and that block group is skipped for purposes of further processing of first model 108. For each S6 address that is allocated during execution of first model 108, the appropriate block group in block group map 102 is updated to receive that S6 address.

Once the first model is fully executed for each block group, processing moves to second model 110. At second model 110, S1 addresses and at least a portion of the remaining unallocated S6 addresses, if any, are allocated within a ZIP code boundary area based upon need and land area overlap. The assumption in this case is that S1 address and the remaining S6 address allocations will correlate with the percentage that a particular ZIP code occupies of a particular block group measured in terms of land area. Specifically, S1 addresses and unallocated S6 addresses are spread to block groups within the ZIP code associated with the S1 and S6 addresses based on two factors: the need for each block group that overlaps that ZIP code, and the percentage of the overlap between the block group and ZIP code. It may be seen then that second model 110 relies upon information found in block group overlap table 34. For example, suppose that a block group 03 has a need of 30 (calculated as described above with respect to first model 108), and that block group occupies 60% of a particular ZIP code as indicated in block group overlap table 34. By multiplying the need by the percentage that the block group occupies of that ZIP code, the ZIP code specific need for this block group, 30×0.60=18, is obtained. Using this need basis, processing is performed for each block group in a manner otherwise analogous to that described above with respect to first model 108. In this case, however, the allocation for a particular block group can exceed the Zip code specific need, but still cannot exceed the total block group need; once the total block group need is satisfied, the block group is ignored for further processing.

The second model is executed in the preferred embodiment in multiple passes, whereby only a fraction of the possible allocations of available households are made in each pass. Specifically, 57% of the available S1 and S6 addresses for each block group are allocated on each of three passes in the preferred embodiment. On a fourth and final pass, all of the remaining households that may be allocated by second model 110 are allocated. The ZIP codes are run in a descending order, with the ZIP codes having the highest total number of S1 and S6 addresses run first. In this manner, each ZIP code may contribute multiple times before any block group is likely to be filled, resulting in a more even distribution for these addresses. The figure of 57% is empirically derived, based on comparisons by the inventors of physical household counts to the results of various runs of the preferred embodiment for sample areas within the United States. The result of this process is an update to block group map 102 to include each allocation of an S1 or S6 address performed by second model 110. It should be noted that the allocation to each block group according to second model 110 is limited by the need of each block group, such that this need is met then that block group is no longer available for further allocation.

Turning now to third model 112, its purpose is to allocate the remaining S1 and S6 addresses, such that these non-specific addresses become fully allocated. The third model 112 allocation is performed based on land area overlap only. Thus third model 112 relies upon information from ZIP overlap table 32. For each ZIP code, the remaining S1 and S6 addresses are allocated to those block groups that overlap that ZIP code, based upon the percentage of that ZIP code that each block group occupies, as derived from ZIP overlap table 32. The values in block group map 102 are then updated with the completed allocation of all S1 and S6 addresses. It may be noted that in practice third model 112 spreads only a small percentage of the total addresses in a typical build file, and thus the preferred embodiment represents a substantial improvement over prior art techniques where all spreading is based upon land area overlap only.

The processing of fourth model 114 begins the allocation of S2 addresses to the appropriate block group. The boundary of a ZIP+2 area is a relatively small area, and thus while the precise location of these addresses is not known, they are limited to a small region. For this reason, the allocation of S2 addresses in the preferred embodiment is limited so that any allocation of an S2 address to a neighboring block group does not cause the S2 address to be allocated outside of the ZIP code to which it was initially allocated based on the address itself. Thus neighbor block group within ZIP table 62 is used for the processing in the fourth model. Since the neighboring block groups listed for each block group in neighbor block group within ZIP table 62 are limited to only those block groups that are neighbors within the particular ZIP code, no allocation in fourth model 114 will take place across a ZIP code boundary, thus enforcing this requirement of the preferred embodiment.

Fourth model 114 functions to allocate S2 addresses from a block group to a neighbor block group within a ZIP code where only one possible block group exists to which the donating block group could allocate an S2 address. Fourth model 114 may thus be referred to as the "one-neighbor" allocation model. In order to determine which block groups meet this criteria, SLP table 106 is used to identify the projected number of households within a block group. This figure is compared to the total number of households allocated to that block group thus far, that is, the total of all specific (S3 and S5) addresses, allocated S2 addresses, and previously allocated (S1 and S6) addresses for that block group. If the difference is positive, then the block group is identified as having an "incline" in the amount of the difference. An incline may be interpreted as an indication that a block group has S2 addresses that may be allocated to other block groups. If the difference between the total of specific and previously allocated addresses and the SLP table 106 prediction is negative, then the block group is identified as having a "decline" in this amount.

In the case of an incline, the incline amount is compared to the total number of S2 addresses present in the block group, and the block group is considered to have a total number of S2 addresses that it may allocate to other block groups that is the lesser of these two totals. It may be seen that the total allocation of S2 addresses from a block group cannot exceed the number of S2 addresses that exist in that block group and corresponding ZIP code from table 62. In the preferred embodiment, however, the block group is also restricted from allocating a number of S2 addresses that would cause it to drop below the projected number of households according to SLP table 106. This limitation acts as a check on the allocation system, keeping it balanced in light of the expected results from U.S. Census Bureau data. In the case of a decline, the block group is determined to not have S2 addresses to allocate, but instead has a need that is measured by the decline difference.

Once the number of S2 addresses that may be allocated from a block group are known, the iterative execution of fourth model 114 may begin. In the case of the preferred embodiment where the area of interest is the United States, a process is run to identify every block group/ZIP code overlap from table 62 that has S2 addresses available to allocate and that has only one possible neighbor that could receive an S2 allocation, that is, one and only one neighbor that has a decline. For each such block group, the model then iterative allocates S2's from the block group with one neighbor needing S2 addresses to such neighbor until either the need is completely filled or all of the available S2 addresses from the block group from which the S2 addresses are being allocated are used up. The complete allocation is made in each iteration. According to the preferred embodiment, fourth model 114 is run in multiple passes, since the allocation process will create new situations where a block group/ZIP code area with S2 addresses to allocate has one and only one neighbor that needs S2 addresses. In the preferred embodiment, fourth model 114 is run repeatedly until a run is reached where no allocations are made. It has been found that in the case of the preferred embodiment, eight to ten iterations of fourth model 114 are typically required in order to reach an iteration where no allocations are made.

Once fourth model 114 is completed, processing moves to fifth model 116. Similar to the processing of fourth model 114, fifth model 116 uses a calculation of inclines and declines for every block group/ZIP code as found in table 62. A process is then performed to identify every block group/Zip code from table 62 that has an incline and has any neighbor with a decline (need). From this information, county table 63 is constructed. County table 63 comprises a list of every block group with available S2 addresses, organized first by the county in which the block group exists and then in order of decreasing number of available S2 addresses. The purpose for this ordering is to ensure that fifth model 116 does not fill all available need using only one neighbor when there are multiple neighbors from which S2 addresses could be allocated in order to fill the available need. The ordering of county table 63 thus provides a smoothing effect on the resulting data. Also, not all possible allocations are made at each block group/ZIP code as it is reached in table 63. Instead, approximately 57% of the possible allocations are made on each pass, with multiple passes being performed in the preferred embodiment until all possible allocations are made within the limits of fifth model 116.

Figure 4:
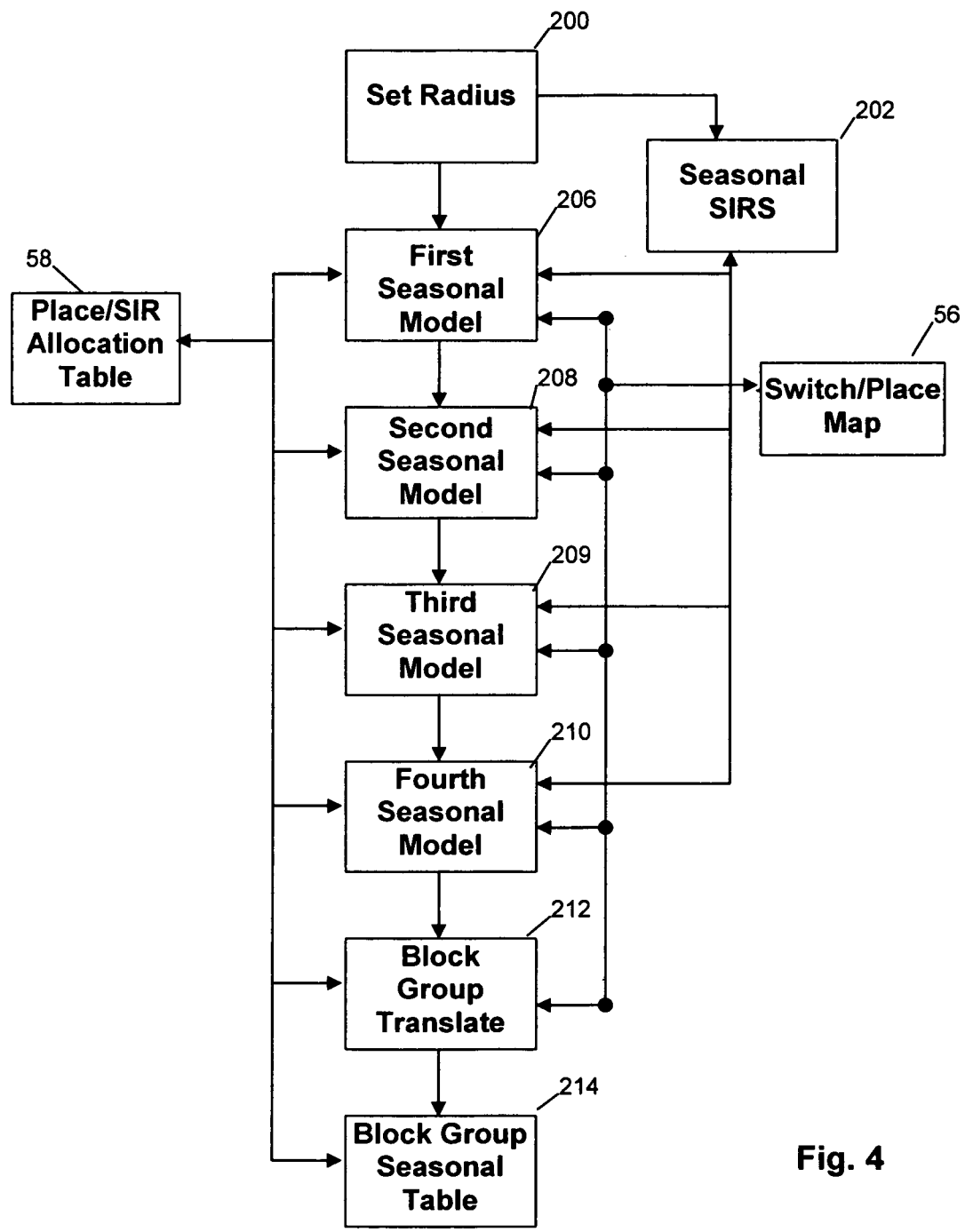
FIG. 4 is a block diagram depicting the seasonal build process for a preferred embodiment of the present invention.

The processing of primary build 10 having now been described with respect to a preferred embodiment, the processing of seasonal build 12 may now be described with reference to FIG. 4. Like primary build routine 10, the basis for performing the various models of seasonal build 12 is a sub-set of the data found in telephony data 18, specifically billing file 45. As already noted, billing file 45 of telephony data 18 comprises a collection of records each containing a telephone number, a name, and a billing address. Since the location of a telephone switch associated with a particular telephone number may be known from LERG file 52 of telephony data 18, the distance from that switch to the billing address identified for a particular telephone number may be known. A record within billing file 45 of telephony data 18 is defined to be a spatially inconsistent record (SIR) if the address of the record does not match the region served by the area code and the particular telephone switch associated with that record. In real world terms, a SIR means that the billing address of the telephone service subscriber is different from the address where the telephone is located. The inventors have found that the great majority of SIRs are associated with seasonal homes, and therefore use the identification of SIRs as the basis for the processing performed in seasonal build 12 in a preferred embodiment of the present invention.

From a review of currently available data, there are believed to be about ten million SIRs in the United States. This number is significantly larger than the estimated number of seasonal homes in the United States. The inventors believe that one reason for the discrepancy is the recently expanded portability of telephone numbers. The "prefix" portion of a telephone number is generally associated with a particular switch in each area code. Under current telecommunications regulations, however, a person may move outside the area normally served by a particular telephone switch yet retain the telephone number, including the prefix, associated with the old address. Telephone numbers that are ported in this manner will show up as SIRs in billing file 45 of telephony data 18. Thus some means of discriminating ported numbers must be incorporated into the invention in order to rely on SIRs for the identification of seasonal homes. In accordance with a preferred embodiment of the present invention, the general method of discriminating ported numbers from seasonal homes in the SIR data is to geographically draw circles of defined radius around the location of each telephone switch, and designate those addresses that lie within the circle as ported numbers. For circles of appropriately chosen size, this approach is believed to provide a very accurate discrimination between ported numbers and seasonal homes. The reason for this is that the great majority of ported numbers represent moves within a close geographic area, such as across a city. Numbers may not be ported to a different area code. Conversely, seasonal homes are usually located a significant distance from the owner's primary residence, and thus the address of a seasonal home will likely fall outside of an appropriately sized circle drawn around the location of the switch associated with the telephone subscriber's billing (that is, primary residence) address.

In a preferred embodiment, the size of the circles drawn for discriminating between ported telephone numbers and seasonal homes depends upon whether the area is designated as rural or urban. This information for any area of the United States is available from the U.S. Census Bureau, and may in the preferred embodiment be found in census data 16. The circles are preferably drawn such that they are larger in urban areas than in rural areas. This is due to the inventors' observation that ported numbers are much more common in urban areas, as a telephone customer may often move from one suburb to another. In particular, a default value of a 40-mile radius is used in the preferred embodiment of the present invention for rural areas, and a default value of a 100-mile radius is used for urban areas. The preferred embodiment of the invention also, however, includes the ability to provide a manual override where the assumptions made in developing these radii are known to be inaccurate. For example, it is relatively common in New Jersey for a homeowner to maintain both a regular home and beach home, where, due to the geography of that state, the beach home may well be quite close to the inland main residence. Using the default value with a 100-mile radius would fail to identify the beach home as a seasonal home. In areas such as this where it is common for homeowners to maintain an inland main residence and a geographically nearby seasonal home, it may be necessary to adjust the radius of the circle to as low as 0 miles in order for the discrimination to yield results that accurately match physical counts of known seasonal homes in an area.

A manual override may be performed in very rural areas that are known to contain a large number of seasonal households. In such areas, the radius of the circle drawn around each switch may be set as low as 0 miles. For example, in the example where the geographic area of interest is the United States, rural Maine is an area where the radius may be set as low as 0 miles, since it is known that many hunting and fishing cabins exist in this area, and since number portability is very unusual due to the highly rural nature of the area.

Turning now to an examination of the particular steps for performing seasonal build 12, the first step is to, as described above, eliminate those SIRs that are associated with ported telephone numbers. The function of set radius block 200 is to determine the radius of the circle to be associated with each telephone switch in the geographic area of interest. LERG file 52 is used to identify the geographic location of every switch. The default value is given to each circle drawn according to the rural or urban designation for the area in which that switch is located, using census data 16. The result is seasonal SIRs table 202, which is based on a plot of each switch and the associated circle drawn around it. Those SIRs that fall within the radius of each of these circles are eliminated, and only the remaining SIRs identified from billing file 45 of telephony data 18 are written to seasonal SIRs table 202. Set radius block 200 also allows for manual adjustment to overcome such situations as nearby seasonal communities or very rural areas as described above. The result again in seasonal SIRs table 202 is the subset of those SIRs from telephony data 18 that are believed to be associated with seasonal homes.

While five models were used in the preferred embodiment of the present invention for allocation in primary build 10, four models are used for allocation in seasonal build 12. In order to perform the allocation of seasonal households, the need associated with each census place in the geographic area of interest, preferably the United States, must be defined. It may be noted that a place is simply a collection of block groups, so the translation between place and block group is merely a roll-up function. The need for a seasonal allocation may be defined as the difference between the most recent census number of households for a particular place and the number of households identified for that place as a result of primary build 10. The need, however, is calculated on the block group level before the roll-up occurs, and thus a two-part calculation must be performed in the preferred embodiment.

The calculation of need for a particular block group will be demonstrated by the example of the place shown in the chart below:

| place | BG | census HH | census VSU | census | primary | need |
|-------|----|-----------|------------|--------|---------|------|
| PL01  | 11 | 200       | 100        | 300    | 350     | 0    |
| PL01  | 12 | 400       | 50         | 450    | 405     | 45   |
| PL01  | 13 | 900       | 10         | 910    | 800     | 10   |
| PL01  | 14 | 1000      | 200        | 1200   | 1100    | 100  |
| PL01  | 15 | 250       | 300        | 550    | 275     | 275  |
| Total |    | 2750      | 660        | 3410   | 2930    | 430  |

In this example, place "PL01" is comprised of five block groups, 11-15. The "census HH" column shows the non-seasonal households for each block group from census data 16, while "census VSU" shows the VSU totals for each block group from census data 16. The "census" column shows the total of the previous two columns as a total census household count. The "primary" column shows the calculated number of households from primary build 10. The final column shows the actual need as calculated according to the preferred embodiment. Need is calculated as the total census (HH+VSU) households minus the number of households calculated at primary build 10. If the calculated result is negative, however, as in the case of block group 11, then a value of "0" is used for the need. It may also be noted that need is never allowed to exceed the census VSU total, so that in the case of block group 13 the actual need is 10 rather than 110.

Once the need for each block group in a place is calculated, the actual need for each block group is summed up to create the need for that place. It should be noted that this is not the same as simply calculating the need for the place as a whole, due to the steps of replacing a negative need calculation with a value of "0" and not allowing need to exceed VSU at the block group level. The calculation of the "weighted need" for each place associated with a particular switch in switch/place map 56 may now be illustrated by the example shown in the chart below:

| place | census HH | census VSU | census | primary | need | weight  |
|-------|-----------|------------|--------|---------|------|---------|
| PL01  | 2750      | 660        | 3410   | 2930    | 430  | 430/880 |
| PL02  | 4000      | 500        | 4500   | 4300    | 300  | 300/880 |
| PL03  | 1250      | 50         | 1300   | 1200    | 50   | 50/880  |
| PL04  | 1400      | 125        | 1525   | 1425    | 100  | 100/880 |

In this example, each of places PL01-PL04 are associated with a particular switch, and thus may receive an allocation associated with that switch. The need is calculated as a roll-up of the need for each block group calculated as set forth above. In addition, a weight is associated with each place based upon the ratio of the need to the total need for all associated places. For example, the resulting weight for PL01 is 430/880=0.488, or 49%. This weight represents the proportion of SIRS from the associated switch that will be allowed to be allocated to PL01 from the switch.

Once the need and weight are identified, first seasonal model 206 first performs a search of switch/place map 56 and identifies each of those switches that can give SIRs to one and only one place based on need. All SIRs available on the switch are allocated to that place until the need for that place is met, or the census VSU total is allocated, whichever is the lesser amount. Since these allocations may create opportunities in other places to fill a need, this process is run iteratively until there are no more switches that can give SIRs to one and only one place based on need. The allocations are recorded at place/SIR allocation table 58.

Second seasonal model 208 is then applied to allocate additional SIRs after the completion of first seasonal model 206. Second seasonal model 208 is not limited to allocation to only those switches that can give to only one place. As in primary build 10, however, the preferred embodiment includes processing to avoid having one switch fill the need for a particular place before another switch is given the opportunity to also fill need in that place. This is, again, an effort to smooth the resulting data. The data from switch/place map 56 is re-ordered such that those switches with the highest number of SIRs are processed first on each iteration. In addition, only about 57% of the possible allocation is performed for each switch on each iteration. Processing continues through successive iterations until all need is met around each switch, or all SIRs have been allocated. Again, the need for a particular place will never be exceeded even if additional SIRs are available for allocation to that place. The inventors have found that this process generally reaches an end in about ten to twelve iterations according to a preferred embodiment of the present invention. Again, the resulting allocations are written to place/SIR allocation table 58.

Next, third seasonal model 209 is applied. Third seasonal model 209 is essentially the same process as second seasonal model 208, except that instead of using need as the limiting factor for SIR allocation, the census VSU total is used. Processing continues through successive iterations until all census-derived VSU space is filled around each switch, or all SIRs have been allocated. As before, the VSU space for a particular place will never be exceeded even if additional SIRs are available for allocation to that place. The resulting allocations are written to place/SIR allocation table 58.

Processing then moves to fourth seasonal model 210. In fourth seasonal model 210, additional SIRs are allocated to places pro-rata across the entire geographic region of interest based simply on the VSU ratio of all places. A special rule applied in fourth seasonal model 210, however, is that the "none place" in each county is restricted such that it cannot take SIRs from switches located within a named place. The reason for this special, rule is that in many counties, particular those with more rural areas, the "none place" takes up so much geographical area that they may otherwise take from a large number of switches. In addition, fourth seasonal model 210 takes into account vacant for rent (VFR) information from census data 16. VFR households are those that are not identified as seasonal, but also are not generally occupied on a permanent basis. These can include, for example, student housing. These types of households are not generally of interest to customers performing site analysis, and thus are not taken into account in all of the preferred embodiments with respect to second seasonal model 208 and third seasonal model 209. This information is reflected in the SIR information of billing file 45 of telephony data 18, however, and thus must be taken into account at this stage. For each place associated with a particular switch, the allocation ratio used is the VSU+VFR for that place divided by the total VSU+VFR for all places associated with the switch. As a result of this inclusion of census-derived VFR data, fourth seasonal model 210 may allocate more SIRs to a place than shown in census VSU data alone.

Now that the SIRs have been allocated through first seasonal model 206, second seasonal model 208, third seasonal model 209, and fourth seasonal model 210, the data must be translated from being based on census place to begin based on block group in order to be useful in further calculations. This is the function of block group translate block 212. This function is itself divided into three steps. The first step is to allocate the seasonal units identified in the previously described seasonal models between VSUs and VFRs for each place. For this purpose, a VSU/VFR ratio may be defined as the census-derived VSU for that place divided by the sum of the census-derived VSU and VFR. The seasonal units are then categorized depending upon the model that spread them to that place, as shown in the following table using three places as an example:

| place | VSU/VFR ratio | spread from model 1 or 4 | spread from model 2 or 3 | VSU SIRs | VFR SIRs |
|---|---|---|---|---|---|
| PL01 | 0.5 | 100 | 200 | 250 | 50 |
| PL02 | 0.1 | 50 | 100 | 105 | 45 |
| PL03 | | 0 | 400 | 400 | 0 |

It will be seen that for place PL01, the VSU/VFR ratio is 0.5. To calculate the number of spread SIRs to allocate to VSU for that place, the number of SIRs spread from models 2 or 3 is added to the product of the number spread from model 1 or 4 multiplied by the VSU/VFR ratio. The result in this case is 200+100×0.5=250. The number of SIRs allocated to VFR is simply the difference between the total number of spread SIRs for that placed minus those allocated to VSU. Thus for PL01, the result is 300−250=50. Likewise, the VSU SIRs total for place PL02 is calculated as 100+50×0.1=105, and the VFR SIRs total for that place is 150−105=45. For place PL03, the VSU/VFR ratio is irrelevant since there were no SIRs spread as a result of models 1 or 4, and thus the number of SIRs spread by models 2 or 3 becomes the number of SIRs assigned to VSU, and there are no SIRs assigned to VFR.

The second step of block group translate block 212 is to take the VSU and VFR assignments from each place and distribute those into VSU and VFR assignments for each of the block groups that comprise that place. The following table may be considered as an example, where a place is comprised of four block groups:

| block group | census HHs | census VSU | calculated HHs | need | weighted need | need allocated VSUs | pro-rata allocated VSUs |
|---|---|---|---|---|---|---|---|
| 01 | 500 | 100 | 525 | 75 | 75/195 | 75 | 16 |
| 02 | 300 | 200 | 400 | 100 | 100/195 | 100 | 32 |
| 03 | 500 | 20 | 700 | 0 | 0 | 0 | 3 |
| 04 | 500 | 20 | 400 | 20 | 20/195 | 20 | 3 |

The census HHs are total households for the block group according to the most recent U.S. Census Bureau data, and census VSU are the number of census-derived VSUs. The calculated HHs figure is the result from primary build 10 described above. The need for each block group is calculated as the total of the census-derived households and VSUs minus the calculated household figure. Thus for block group 01, the need is 500+100−525=75. It may be noted that the need for block group 03 is 0 because the need is not allowed to be a negative number, and the need for block group 04 is 20 because the need is not allowed to exceed the census-derived VSU total. The weighted need is calculated as the need of a block group divided by the total need for the place. The total number of VSUs available in that place is then multiplied by the weighted need to yield the number of VSUs allocated to each block group in that place, so as the number allocated does not exceed the need of the Block Group; in this example, the place had 250 VSUs to allocate.

It may be seen that the above calculation allocated among the block groups only 195 of the possible 250 VSUs for the place, and none of the VFRs have yet been distributed. In the third step of block group translate block 212, the remaining VSUs that were not allocated will be distributed along with the VFRs. The remaining VSU SIRs are allocated across each block group within the place based upon a pro-rata comparison of the census-derived VSU data for each of those block groups within the place (Block Group VSU/Place VSU). The VFR for the place is spread among the block groups in an analogous manner using the census VFR to calculate the distribution ratios. The pro-rata distributions based upon the appropriate relative totals are then written to block group seasonal table 214, which contains for each block group the VSU and VFR calculations from above. At the conclusion of these calculations, all of the place's VSUs and VFRs will have been spread among its constituent block groups.

It should be noted at this point that some seasonal homes are in fact included in the general household counts process described previously. The reason for this is that if someone decides to list a telephone number for a seasonal home in the local telephone directory, it will show up in the general household data. It will not be shown as a SIR because the process used to create telephony data 18 looks for the "best" address, which in this case will be the address shown in this local listing, not necessarily the billing address. This is a more common occurrence in "snowbird" and high-income housing areas. In extremely upscale areas (such as, for example, the Hamptons), this occurrence is not as common because residents in these areas prefer to have no telephone directory listing for either their regular or seasonal home. The problem of seasonal homes with telephone directory listings, however, is important in the processing of merge build 14 as explained below.

Figure 5:
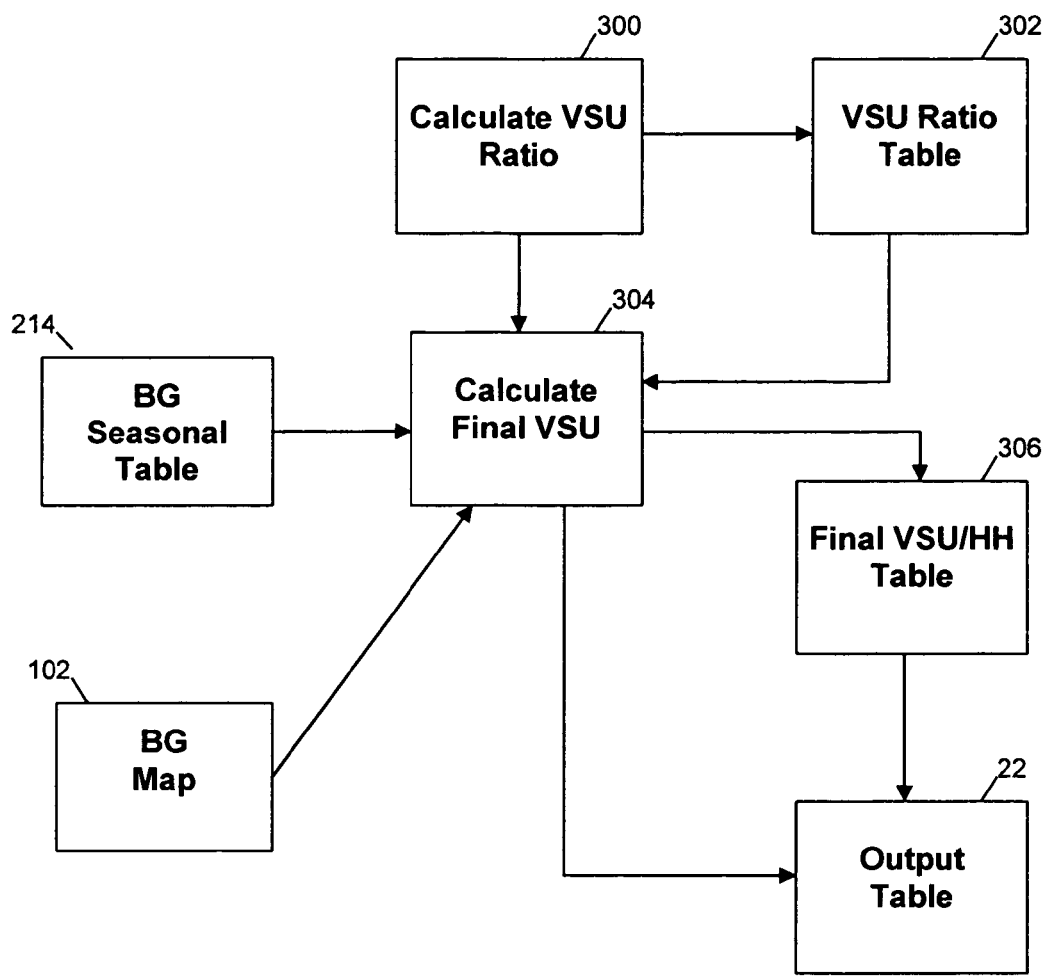
FIG. 5 is a block diagram depicting the merge process for a preferred embodiment of the present invention.

Once seasonal build 12 is completed, the process of performing merge build 14 may be described with reference to FIG. 5. From previous calculations, the calculated VSU and VSU+VFR total for each block group are stored in block group seasonal table 214. The final results, to be output in table 22, need to show the final HH number, final VSU number, and final VFR number for each block group in the preferred embodiment. These figures cannot be calculated, however, by simply moving the totals from primary build 10 together with the VSU and VFR numbers from seasonal build 12. The reason for this is that the data used for primary build 10, as explained above, will include some seasonal homes. A purpose of merge build 14 then is to move the proper number of households from the results of primary build 10 to the calculated VSU totals from seasonal build 12. It may be noted, however, that the calculated VFR numbers are passed through unchanged from seasonal build 12 to output file 22 in the preferred embodiment.

In the first step, a VSU ratio is calculated at calculate VSU ratio block 300. The VSU ratio for each block group is defined, using census data 16, as the VSU/(VSU+total HH) for that block group. The total HH in this case is the number of households found in the most recent decennial census for that block group, as found in HH counts 35 of census data 16. The resulting ratio thus represents the percentage of VSUs as measured against all households in a particular block group at the time that the last census was taken. It may be noted that by using this ratio in further processing, an implicit assumption is being made that the ratio of seasonal homes to total homes in an area has not significantly changed since the date of the last decennial census. This may not be perfectly accurate in all cases, particularly in circumstances such as beach communities becoming primary households due to telecommuting and similar trends, but the census data is the only available source of physical counts for seasonal households, and thus this ratio is used as the closest available approximation in the preferred embodiment of the invention. The result of calculate VSU ratio routine 300 is VSU ratio table 302, containing a record for each block group that contains its associated VSU ratio.

Using the VSU ratio table 302, the results are compared to the data from block group seasonal table 214 at calculate final VSU block 304. If the VSU ratio for each block group predicts fewer or the same number of VSUs as found in the appropriate record of block group seasonal table 214, then the VSU number from table 214 remains unchanged, and this becomes the final VSU found in final VSU/HH table 306. Final VSU/HH table 306 comprises a record for each block group that contains that block group's final calculated VSU, VFR and HH totals. If, on the other hand, there are fewer calculated VSUs in table 214 than predicted, then calculated households are moved from the number resulting from primary build 10, as recorded in block group map 102, to the VSUs derived from block group seasonal table 214 in order to generate a final primary HH and VSU count for final VSU/HH table 306. Again, it may be noted that the VFR data is passed along unchanged, but is also written to final VSU/HH table 306. An example may be provided in the following table for two block groups:

| block group | primary HH | VFR from SIRs | VSU from SIRs | primary + VSU | VSU ratio | expected VSU | final HH | transfer from primary | final VSU | final VFR |
|---|---|---|---|---|---|---|---|---|---|---|
| 01 | 80 | 15 | 20 | 100 | .10 | 10 | 80 | 0 | 20 | 15 |
| 02 | 80 | 15 | 20 | 100 | .30 | 30 | 70 | 10 | 30 | 15 |

In this example, it may be seen that the total households from primary build 10 is 80 in each case. The VFR total, which does not change, is 15 in each case, and the calculated VSU from seasonal build 12 is 20 in each case. The difference between the block groups, however, is that block group 01 has a census VSU ratio from VSU ratio table 302 of 0.10, while block group 02 has a ratio of 0.30. The predicted VSU total for block group 01 would, therefore, be (80+20)×0.10=10. Since this is fewer than the 20 VSUs calculated at seasonal build 12 and shown in block group seasonal table 214, there is no transfer of households from the total generated in primary build 10 and reflected in block group map 102, and the final VSU and HH totals written to final VSU/HH table 306 are the same as the VSU and HH totals calculated at seasonal build 12 and primary build 10, respectively. On the other hand, the predicted VSU total for block group 02 would be (80+20)× 0.30=30, which exceeds the VSU total calculated in seasonal build 12. The difference between these totals, 10, is the number of households that are borrowed from the result of primary build 10 and added to the VSU total calculated at seasonal build 12. The final VSU for block group 02 then is 30, and the final HH total is 70; these values are written to final VSU/HH table 306, along with the unchanged VFR total.

Output table 22 comprises, in a preferred embodiment, a record for each block group that includes the total households from del-stat adjust block 310 of FIG. 3, the calculated HH from HH factor table 99, and the VSU and VFR totals for that block group from block group seasonal table 214. In addition, the data in output table 22 may also include associated official census data for each block group. It may also include, for example, the latest census household size data for that block group as well, since some customers may wish to review site information based on population, and multiplying the number of households by the average household size in a block group will yield an estimate of the population within that block group. Other information, whether calculated or passed through from available data sources, may be included in output table 22 in alternative embodiments of the present invention.

The foregoing description applies to one of the preferred embodiments of the invention, where the U.S. Census Bureau data concerning vacant units are taken essentially at face value. In certain alternative preferred embodiments of the invention, however, the VSU and VFR numbers applied in the calculations described above are restated in order to increase the accuracy of the method. The purpose for this restatement is to correct for errors in the method of data collection performed by the U.S. Census Bureau that are believed to have a significant effect on the household counts within block groups with certain characteristics. For example, there are certain instances where it is believed that a significant number of VSUs are incorrectly counted as VFRs. This is a result of the methodology employed by the U.S. Census Bureau. In addition, the restatement according to this alternative preferred embodiment of the present invention will include some of the other vacant unit categories from U.S. Census Bureau data, namely, vacant for sale (VFS), vacant (rented or sold), and vacant (other), in the final calculations.

Figure 6:
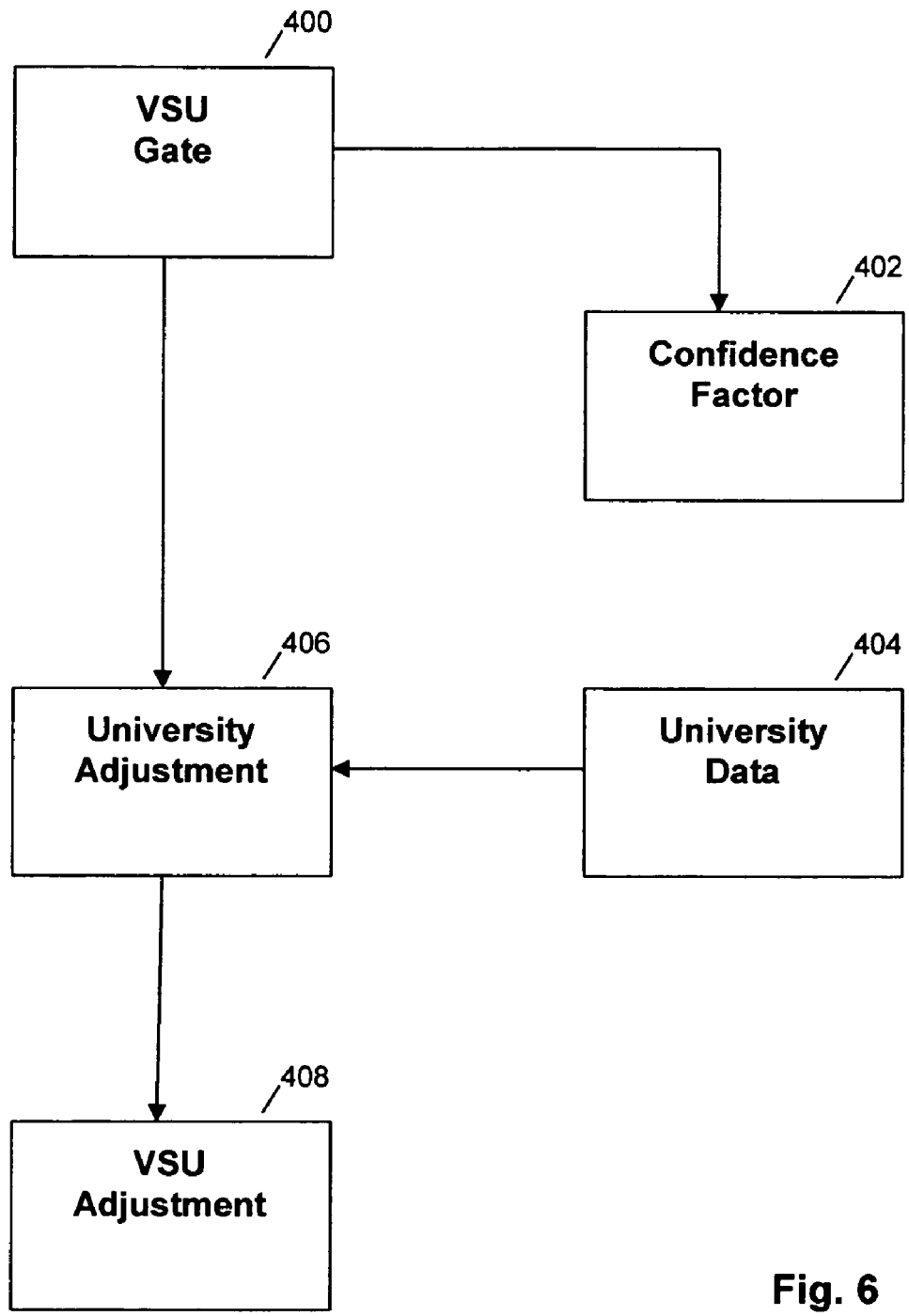
FIG. 6 is a block diagram depicting the VSU/VFR restatement process for an alternative preferred embodiment of the present invention.

As a first step in this process of creating a restated VSU and VFR number for each block group, the first step is to determine if, for that block group, the number of households in other vacant categories is sufficient to justify an adjustment to the census data for VSUs and VFRs. Referring now to FIG. 6, a "VSU Gate" figure is computed at block 400, where a VSU Gate value of 1 (or "positive") for a block group indicates the seasonality of the area. A series of nine models are applied with respect to each block group and the place within which that block group is located within VSU gate block 400. With respect to each model, a score of 1 (pass) or 0 (fail) is assigned.

The first five models apply to the block group itself. Block group model 1 queries whether the census-derived VSU divided by the census-derived VFR is 0.3333 or greater. Block group model 2 queries whether the census-derived VSU is non-zero and greater than or equal to the census-derived VFR. If block group model 2 is positive, then the block group is said to be "VSU dominant." Block group model 3 queries whether the block group of interest has one or more neighbor block groups that are VSU dominant. Block group model 4 queries whether the geography of the block group of interest is 20% or more water. This model is included because it is believed that seasonal units are more common in waterfront areas. Block group model 5 queries whether the block group of interest contains one or more blocks that have more than 20 housing units and more than 80% of the housing units are VFRs.

The other four models are applied with respect to the census place associated with the block group of interest. Place model 1 queries whether the census-derived VSU for that place divided by the census-derived VFR for that place is 0.3333 or greater. Place model 2 queries whether the census-derived VSU for that place is non-zero and greater than or equal to the census-derived VFR for that place. If place model 2 is positive, then the place is said to be VSU dominant. Place model 3 queries whether the census-derived VSU for that place divided by the number of resident households according to census records is 0.10 or greater. Place Model 4 queries whether the sum of the census-derived VSU and VFR for that place divided by the number of resident households according to census records is 0.10 or greater.

Once each of the nine models are run, their results are used to determine if the VSU gate is assigned a value of "1" or "0" for each block group. A value of "1" is assigned if (a) four or more of the nine models yield a positive result; (b) the block group is VSU dominant (i.e., model 2 yields a positive result); or (c) the block group has a VSU dominant neighbor (i.e., model 3 yields a positive result) and at least two of the other models yield a positive result. If none of these are true, then the block group is assigned a value of "0." For example, suppose that the results for block group models 1-5 and place models 1-4 were 1, 0, 1, 1, 0, 1, 0, 0, and 0, respectively. Applying the methodology described above, this would result in a VSU gate value of "1," that is, positive, since four of the nine models passed and both model 3 pass and at least two other models pass.

In certain preferred embodiments, a confidence factor may be calculated in connection with the VSU gate calculation for each block group at block 402. The purpose of the confidence factor is to provide a relative level of confidence for how likely it is appropriate to restate the seasonal statistics based upon the VFR methodology described herein. The confidence factor is calculated at block 402 as the sum of the numerical score for block group models 1, 2, and 3, multiplied by 2, added to the sum of block group models 4 and 5 and place models 1, 2, 3, and 4, the cumulative sum of the foregoing being divided by the maximum possible value of 12. Consider the example given above, where the results for block group models 1-5 and place models 1-4 were 1, 0, 1, 1, 0, 1, 0, 0, and 0, respectively. The confidence factor with respect the assignment of a positive VSU gate value would be [(1+0+1)*2+1+0+1+0+0+0]/12=0.5, or 50%.

In preparation for a next step of the VSU and VFR restatement procedure according to a preferred embodiment, it has been noted by the inventors that VFR counts near universities are problematic. The VFR counts in these areas tend to indicate student housing, which should not be included in seasonal housing. In order to determine which block groups are associated with universities, data is applied from university data 406, which contains information from the U.S. Department of Education, Office of Post-Secondary Education, concerning public and private, four-year universities and colleges with an enrollment of at least 750 students. Such universities are geocoded and associated with the corresponding block group at university adjustment block 406. The distance from the university to the centroid of each block group is then calculated at university adjustment block 406. For purposes of this step, all block groups are initially "disqualified," that is, considered to not be candidates for VSU restatement due to the university effect. If the model sum described above for purposes of calculating the VSU was 6 or higher, then the block group is qualified regardless of the presence of a university. This reflects a high percentage of seasonal units in the area despite the possible university factor. If the block group is at least one mile from a university and had a model sum of 3 or higher, then it is qualified. This reflects the fact that university housing tends to be quite close to a university, although some housing may be in outlying areas. If the block group is at least four miles from a university, then it is qualified regardless of its model sum, and thus the VSU gate is driven entirely by the calculations described above and the presence of a university is ignored. This reflects the assumption that a non-significant portion of university housing is present more than 4 miles from a block group associated with that university.

Having now calculated a VSU gate for each block group in the area of interest, the process turns to calculating a restated VSU and VFR for each such block group at VSU/VFR adjustment block 408. Several intermediate values must be calculated during this process according to a preferred embodiment. The non-resident ratio is defined as the total number of vacant units of all types from census data divided by the total number of all housing units from census data. The VSU ratio is calculated as the census-derived VSU divided by the sum of the census-derived VSU and VFR totals. Likewise, the VFR ratio is calculated as the census-derived VFR divided by the sum of the census-derived VSU and VFR totals. A gated vacant (other) value is calculated as being equal to the census-derived vacant (other) total when the VSU gate is positive, or equal to zero if the VSU gate is negative. A gated vacant (for sale or sold) value is calculated as the sum of the census-derived VFS and vacant (rented or sold) multiplied by the non-resident ratio if the VSU gate is positive, or equal to zero if the VSU gate is negative. Using these values, the restated VSU may now be calculated as the census-derived VSU+the product of the VFR ratio and the sum of the gated vacant (for sale or sold) plus the gated vacant (other) values. Likewise, the restated VFR may now be calculated as the census-derived VFR+the product of the VFR ratio and the sum of the gated vacant (for sale or sold) plus the gated vacant (other) values.

Once the restated VSU and VFR are calculated as described above, the census-derived vacant (other) total for a block group is added to the restated VFR for a final VFR total if the restated VSU is more than 500% of the census-derived VSU, or the block group contains a block with an abnormal vacant (other) total as empirically determined and the restated VSU is more than 200% of the census-derived VSU for that block group. These restated VSU and VFR numbers are then used in all of the calculated described herein with respect to the household and seasonal builds in place of the census-derived VSU and VFR totals for each block group.

Another issue addressed in certain preferred embodiments of the present invention relates to the difficulty of identifying seasonal units based solely on telephony data 18. Since this data is derived from telephone service information, it will not include seasonal units that are not associated with a unique telephone line. Such units might include, for example, hunting cabins in very rural areas, which typically do not have landline telephone service, and timeshare or resort units where telephone service is provided by a switchboard associated with the property as a whole. States such as Michigan and Wisconsin, for example, have significant numbers of remote houses and cottages used for hunting, fishing, and camping that do not receive mail or have telephones. As an example of the timeshare issue, Hilton Head, S.C. has more timeshares and resorts than any other location in the United States. The majority of these timeshares and resorts, however, do not have individual-level telephone lines or mail service. Since there is no other direct source of data regarding seasonal units, these types of units would likely go uncounted if telephony data 18 were relied upon solely to generate seasonal counts. As a result, an additional category of seasonal unit may be defined as the non-commercial seasonal unit (NCSU).

Figure 7:
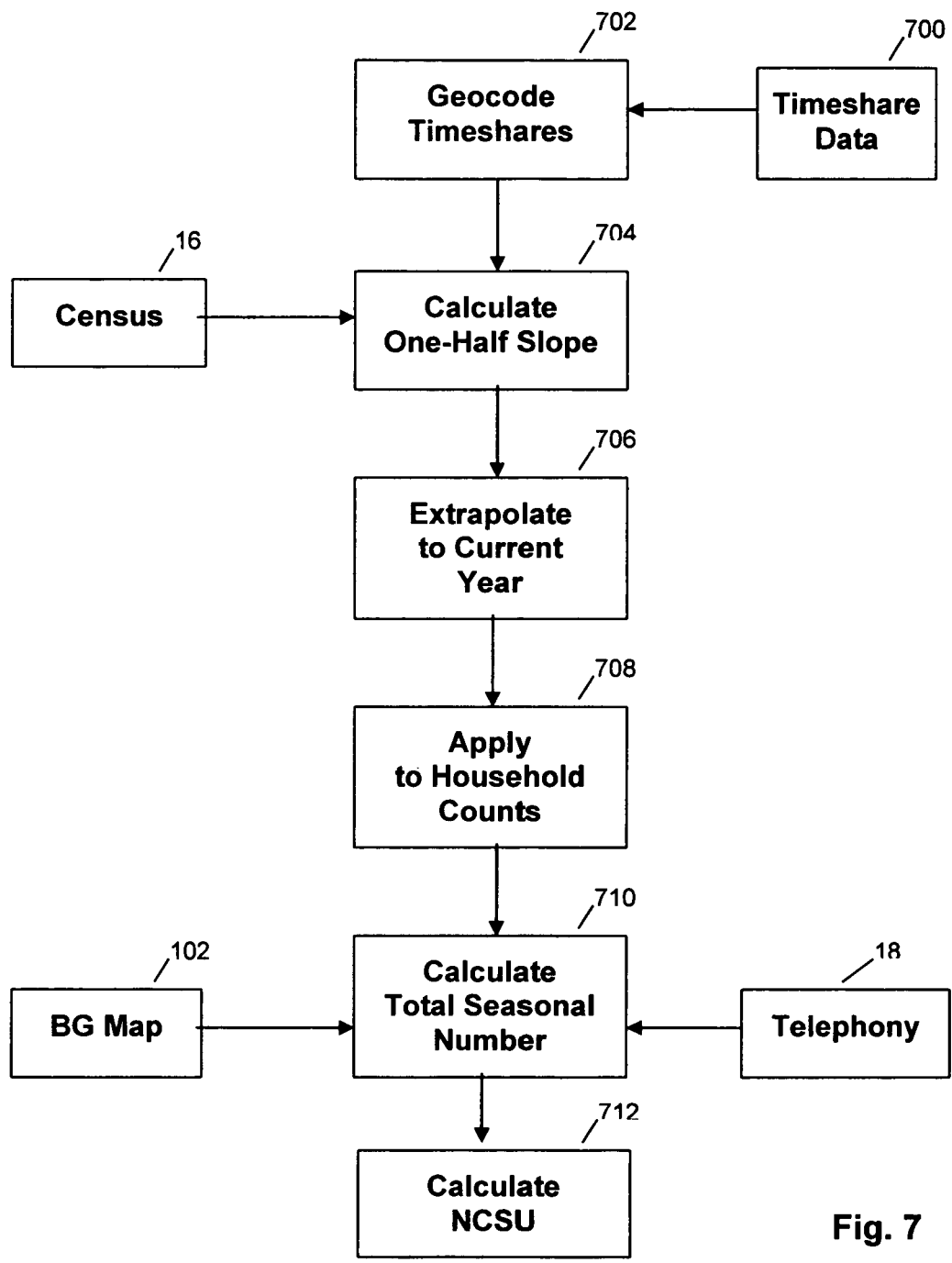
FIG. 7 is a block diagram depicting the process for calculating a non-commercial seasonal unit (NCSU) count according to an alternative preferred embodiment of the present invention.

As a first step in the NCSU calculations according to a preferred embodiment of the present invention as illustrated in FIG. 7, a database of timeshare/resort data 700 is created. These timeshare/resort properties reflected in timeshare/resort data 700 are then mapped and associated with the block group in which they are located at block 702. It has been found that with respect to 2000 U.S. Census data, only about 0.5% of all block groups in the United States are associated with timeshare/resort properties, but these block groups represented 16% of all seasonal units identified in the United States.

The calculation of the NCSU value for a particular block group identified as a candidate begins with a comparison of recent and next-most-recent data from the U.S. Census Bureau for total households. For example, if the 2000 census is the most recent, then the data for the 2000 census and 1990 census will be employed. This data is reflected in the barchart of FIG. 8 by bars 802 and 800, respectively, where the white portion of each bar illustrates non-seasonal households and the horizontally-barred portion represents VSUs. It may be noted that both non-seasonal household and VSU data is included in bar 802, since in this example 2000 census data is used, for which VSU data is available.

Figure 8:
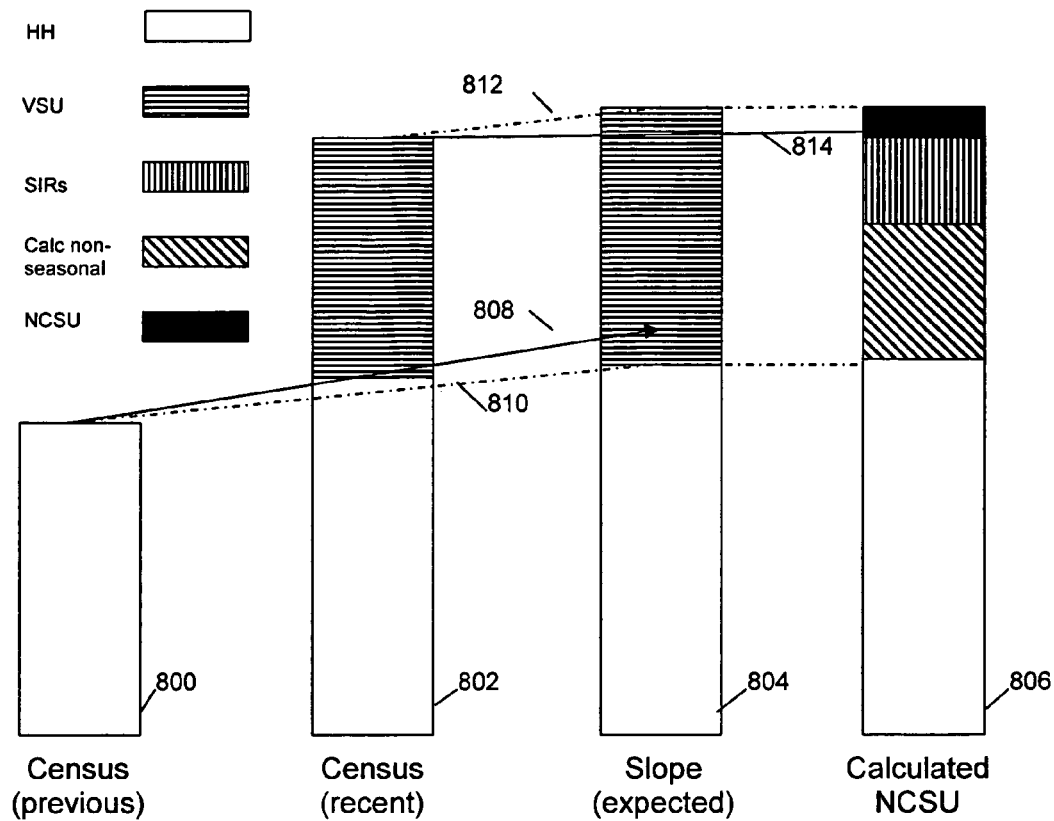
FIG. 8 is a bar chart depicting the process for calculating an NCSU count according to an alternative preferred embodiment of the present invention.

The slope of the change (that is, the growth or decline rate) in census-derived non-seasonal households is identified by slope line 808, and a value representing one-half of that slope is calculated at block 704, illustrated by one-half slope line 810. Half-slope line 810 is then extrapolated to create current-year data at block 706 of FIG. 7, resulting in a modeled total non-seasonal household figure based solely on census data. This is reflected in FIG. 8 as the white portion of bar 804. The slope of one-half slope line 810 is then applied to create VSU slope line 812 as shown in FIG. 8, which is used to set the total (non-seasonal plus VSU) census-projected household count for the current year at bar 804. The projected VSU count for the current year is then the difference between the values that result from the application of half-slope line 810 and VSU slope line 812, shown as the horizontally-barred portion of bar 804.

At block 708, the constructed household counts from output table 22 are applied for purposes of comparison to this projected census-derived data. A portion of the households in the constructed non-seasonal household count as reflected in block group map 102 have been allocated to seasonal units, as explained above, based on an belief that some of the households shown: in the non-seasonal count are in fact seasonal. The "floor" for the adjustment, however, is the value that represents a household count on the one-half slope projection line 810 of FIG. 8. In other words, the floor is the furthest point that constructed non-seasonal data will be borrowed and added to constructed seasonal data. The SIRs (vertically barred portion of bar 806 in FIG. 8) from telephony data 18 are added to this figure to create a total seasonal number, which is the output from block 710. This total seasonal number is shown as the total of the vertically barred and diagonally barred portions of bar 806.

The final step in the calculation of the NCSU value is then performed at block 712 of FIG. 7. The NCSU count is modeled as the difference between the census-derived projected total household count at bar 804 and the total calculated household count. The NCSU count is shown in FIG. 8 as the black portion of bar 806.

It may be noted that the inclusion of the NCSU units represents the only part of any of the preferred embodiments of the present invention that relies on modeled data rather than actual household counts from one or more data sources. While modeled data is generally avoided throughout the preferred embodiment, there is no known and widely available data source that would provide NCSU data, and thus modeling is necessary with respect to this element. It should be noted, however, that this data is only really relevant to two types of areas, those that are extremely rural and those that involve a large number of timeshares or resorts. The extremely rural areas are generally not of interest for retail site placement, and the presence of timeshares may not be relevant to many types of retail developers, since persons that stay in timeshares are generally in an area only for a limited time and will, not be interested in many types of services that are not associated with tourism.

A final alternative embodiment of the present invention may include the restatement of certain values generated in output table 22 in the case where particular block groups are determined VFR counts appear in particular to be associated with seasonal addresses. It may be noted that this alternative embodiment may be used as a stand-alone process on any given data including these parameters, as its functionality is separate from the processing that has been described above, although it will be described herein with reference to data generated as described above for output table 22. The overall purpose here is to reassign households between the seasonal and non-seasonal categories to compensate for misstatement of seasonal households as VFRs in the U.S. Census data.

The VSU gate (described above) is first performed, and for only those block groups for which the VSU gate is positive will the following calculations be performed. For each such block group, it must first be determined if VFR addresses are showing up in the primary build 10 (calculated non-seasonal) household counts. This is determined by comparing the calculated non-seasonal count to the sum of the most-recent census data for non-seasonal households, VFRs, and any census VSUs that are not accounted for by SIRs in the seasonal build 12. If it is determined that VFR addresses are in the calculated non-seasonal counts from primary build 10, then a new seasonal household count is generated. A ratio is calculated as the total of the census-derived VSU and VFR divided by the total of the census-derived VSU, VFR, and non-seasonal households. This ratio is multiplied by the sum of the calculated household count from primary build 10 and the SIRs for the associated block group, resulting in a new calculated seasonal household count for that block group. In effect, this process allows household counts to be pulled from the results of primary build 10 in the event that the SIRs for the block group do not account for the total seasonality, that is, the sum of VSUs and VFRs for that block group.

In the case when it is determined that VFR addresses are not present in the calculated non-seasonal counts from primary build 10, then SIRs that were previously stated as VFRs are simply removed from the calculated VFR category and added to the calculated VSU total. Using this embodiment of the invention, further households may not be pulled from the calculated non-seasonal total from primary build 10. The re-calculated non-seasonal, VSU, and VFR totals are then written to output table 22.

The present invention has been described with reference to certain preferred and alternative embodiments that are intended to be exemplary only and not limiting to the full scope of the present invention as set forth in the appended claims.

The invention claimed is:

1. A method of counting households within a geographic region utilizing at least one geographic information service (GIS) database, a preprocessing routine, a primary build routine, a seasonal build routine, and a merge routine, wherein the primary build routine, seasonal build routine, and merge routine are in communication with the GIS database, the method comprising the steps of:
 (a) receiving as input at the at least one GIS database a plurality of data sets, wherein each of the data sets comprises a plurality of households, wherein each of the plurality of households is either a non-seasonal household or a seasonal household, wherein at least one of the plurality of households is a non-seasonal household and at least one of the plurality of households is a seasonal household, and wherein each of the households is associated with a geographic sub-region within the region;
 (b) calculating at the preprocessing routine a set of geographic correspondences between the sub-regions of at least two of the plurality of data sets;
 (c) utilizing at the primary build routine the set of correspondences to allocate the non-seasonal households from at least one of the plurality of data sets to at least one of the geographic sub-regions, wherein the allocation step is performed by one of a plurality of models, and further wherein the plurality of models comprises at least one of a postal delivery statistics model, a postal-to-census-data boundary overlap model, and a need-allocation model;
 (d) calculating an actual need for at least one of the geographic sub-regions, wherein the actual need includes a weighting factor which determines a proportion of seasonal households to be allocated to the at least one geographic sub-regions;
 (e) utilizing at the seasonal build routine the set of geographic correspondences to incrementally allocate the seasonal households to at least one of the geographic sub-regions based on the calculated actual need; and
 (f) merging at the merge routine the results of the steps of allocating the number of non-seasonal and seasonal households.

2. The method of claim 1, wherein one of the data sets comprises postal service delivery statistics.

3. The method of claim 2, wherein one of the data sets comprises a plurality of matched landline telephone numbers and addresses.

4. The method of claim 3, wherein one of the data sets comprises census-derived households counts.

5. The method of claim 3, wherein one of the data sets comprises a plurality of matched geographic locations and corresponding landline telephone switches.

6. The method of claim 4, wherein said calculating geographic correspondences step comprises the step of calculating a correspondence between a set of postal service-defined delivery areas and a set of census-defined areas.

7. The method of claim 6, further comprising the step of creating an overlap table comprising a set of values indicating a degree of overlap between a post service-defined delivery area and a corresponding census-defined area.

8. The method of claim 6, wherein said calculating geographic correspondences comprises the step of calculating a correspondence between a geographic location of one of the landline telephone switches and the corresponding census-defined area.

9. The method of claim 6, wherein the census-derived areas comprise U.S. Census Bureau places, and none places, wherein each none place comprises the portion of a county that is not associated with a U.S. Census Bureau place.

10. The method of claim 1, wherein said calculating correspondences step comprises the step of calculating a household factor table for each of one of the sets of sub-regions.

11. The method of claim 10, wherein at least one of said allocating the number of non-seasonal households step and said allocating the number of seasonal households step comprises the step of spreading a subset of the households from a first geographic sub-region associated with each of the households to a second geographic sub-region.

12. The method of claim 11, wherein at least one of said allocating the number of non-seasonal households step and said allocating the number of seasonal households step further comprises the step of calculating the need associated with at least one sub-region, and said spreading step is limited to not spreading a greater number of households to such sub-region than the need associated with such sub-region.

13. The method of claim 1, wherein the number of households in at least one of the sub-regions comprises a number of vacant seasonal units (VSUs) and a number of vacant for rent (VFR) units, and said step of utilizing the set of geographic correspondences to count the number of seasonal households within at least one of the sub-regions comprises the step of adjusting the number of VSUs and the number of VFR units within the number of seasonal households with respect to the at least one of the sub-regions in order to correct at least one of the plurality of data sets.

14. The method of claim 13, wherein said step of adjusting the number of VSUs and VFR units comprises the step of calculating a VSU gate, wherein the VSU gate comprises a score indicative of the seasonality of the household counts in the at least one of the sub-regions, and wherein an adjustment to the number of VSU and VFR units is performed if the score is positive, and no adjustment to the number of VSU and VFR units is performed if the score is negative.

15. The method of claim 14, wherein said step of utilizing the set of geographic correspondences to allocate the number of seasonal households within at least one of the geographic sub-regions comprises the step of calculating a VSU restatement confidence factor.

16. The method of claim 1, wherein said step of utilizing the set of geographic correspondences to count the number of seasonal households within at least one of the geographic sub-regions comprises the step of calculating a non-commercial seasonal unit (NCSU) total with respect to at least one of the geographic sub-regions, wherein a NCSU comprises a seasonal household without a landline telephone line.

17. The method of claim 16, wherein said step of calculating an NCSU total is applied with respect to those geographic sub-regions associated with the presence of at least one of timeshares and resorts.

* * * * *